US012558938B2

(12) United States Patent
Lin et al.

(10) Patent No.: US 12,558,938 B2
(45) Date of Patent: Feb. 24, 2026

(54) THERMAL MANAGEMENT SYSTEM, VEHICLE, AND THERMAL MANAGEMENT METHOD

(71) Applicants:Zhejiang Geely Holding Group Co., LTD., Zhejiang (CN); ZHEJIANG LIANKONG TECHNOLOGIES CO., LTD, Zhejiang (CN)

(72) Inventors: Bingrong Lin, Zhejiang (CN); Junbo Xu, Zhejiang (CN); Guibin Li, Zhejiang (CN); Qiang Xue, Zhejiang (CN); Haijiang Dai, Zhejiang (CN)

(73) Assignees: Zhejiang Geely Holding Group Co., LTD., Zhejiang (CN); ZHEJIANG LIANKONG TECHNOLOGIES CO., LTD., Zhejiang (CN)

( * ) Notice: Subject to any disclaimer, the term of this patent is extended or adjusted under 35 U.S.C. 154(b) by 143 days.

(21) Appl. No.: 18/403,724

(22) Filed: Jan. 4, 2024

(65) Prior Publication Data

US 2024/0149639 A1     May 9, 2024

Related U.S. Application Data

(63) Continuation of application No. PCT/CN2022/092868, filed on May 13, 2022.

(30) Foreign Application Priority Data

Sep. 27, 2021   (CN) .......................... 202111137071.2
Sep. 27, 2021   (CN) .......................... 202111138847.2

(51) Int. Cl.
 *B60H 1/00*          (2006.01)
 *B60H 1/32*          (2006.01)

(52) U.S. Cl.
 CPC ..... *B60H 1/00885* (2013.01); *B60H 1/00278* (2013.01); *B60H 1/00485* (2013.01); *B60H 2001/3291* (2013.01)

(58) Field of Classification Search
 CPC ............ B60H 1/00885; B60H 1/00278; B60H 1/00485; B60H 2001/3291
 See application file for complete search history.

(56) References Cited

U.S. PATENT DOCUMENTS 12,345,340 B2 *   7/2025  Lin ..................... F16K 11/0856
2011/0296855 A1   12/2011  Johnston et al.
(Continued)

FOREIGN PATENT DOCUMENTS

CN          104752745          7/2015
CN          205768485          12/2016
(Continued)

OTHER PUBLICATIONS

"International Search Report (Form PCT/ISA/210) of PCT/CN2022/092868," mailed on Jul. 6, 2022, with English translation thereof, pp. 1-6.

(Continued)

*Primary Examiner* — Marc E Norman
(74) *Attorney, Agent, or Firm* — JCIPRNET

(57) ABSTRACT

A thermal management system, a vehicle, and a thermal management method. The thermal management system includes a tank assembly and a valve unit, the tank assembly includes a shell body and a cover plate, the shell body covers the cover plate and forms an accommodation chamber together with the cover plate, and the valve unit is installed on the shell body; the accommodation chamber is internally provided with a plurality of pipelines for liquid circulation, the shell body has a plurality of connection ports communicating with the accommodation chamber, a first end of the (Continued)

pipeline is correspondingly in communication with the connection port, and a second end of the pipeline and a portion of the pipeline are located outside of the accommodation chamber; and the valve unit has a plurality of valve ports correspondingly in communication with the connection ports.

18 Claims, 19 Drawing Sheets

(56) References Cited

U.S. PATENT DOCUMENTS

| | | | |
|---|---|---|---|
| 2014/0096560 A1 | 4/2014 | Kim et al. | |
| 2014/0123698 A1 | 5/2014 | Zhang et al. | |
| 2017/0152957 A1* | 6/2017 | Roche | B60L 58/26 |
| 2017/0373359 A1 | 12/2017 | Krull et al. | |
| 2019/0337355 A1 | 11/2019 | Shah et al. | |
| 2020/0148039 A1 | 5/2020 | Tan | |
| 2021/0053415 A1* | 2/2021 | Oh | B60H 1/3229 |
| 2021/0080027 A1 | 3/2021 | Schoeneman et al. | |
| 2023/0415541 A1* | 12/2023 | Lin | B60H 1/3229 |
| 2023/0415544 A1* | 12/2023 | Lin | B60H 1/00485 |
| 2024/0317017 A1* | 9/2024 | Brock | B60K 11/02 |
| 2025/0050704 A1* | 2/2025 | Yang | B60H 1/3227 |

FOREIGN PATENT DOCUMENTS

| | | |
|---|---|---|
| CN | 108087583 | 5/2018 |
| CN | 110481275 | 11/2019 |
| CN | 110529628 | 12/2019 |
| CN | 111251823 | 6/2020 |
| CN | 111361391 | 7/2020 |
| CN | 112319210 | 2/2021 |
| CN | 112389155 | 2/2021 |
| CN | 112406494 | 2/2021 |
| CN | 112543709 | 3/2021 |
| CN | 113173050 | 7/2021 |
| CN | 113232488 | 8/2021 |
| CN | 113276628 | 8/2021 |
| CN | 113276630 | 8/2021 |
| CN | 113829831 | 12/2021 |
| CN | 113829832 | 12/2021 |
| CN | 113829857 | 12/2021 |
| DE | 102020132788 | 6/2021 |
| JP | 2014218211 | 11/2014 |
| JP | 2021047000 | 3/2021 |
| KR | 102290361 | 8/2021 |
| RU | 193446 | 10/2019 |
| WO | 2016163771 | 10/2016 |
| WO | 2020246792 | 12/2020 |
| WO | 2021048095 | 3/2021 |

OTHER PUBLICATIONS

"Written Opinion of the International Searching Authority (Form PCT/ISA/237) of PCT/ CN2022/092868," mailed on Jul. 6, 2022, with English translation thereof, pp. 1-8.

"Search Report of Europe Counterpart Application", issued on Oct. 2, 2024, p. 1-p. 7.

"Office Action of Japan Counterpart Application", issued on Dec. 4, 2024, with English translation thereof, p. 1-p. 14.

"Office Action of China Counterpart Application No. 202111137071. 2", issued on Jan. 11, 2024, with English translation thereof, p. 1-p. 12.

"Office Action of China Counterpart Application No. 202111138847. 2", issued on Jan. 22, 2024, with English translation thereof, p. 1-p. 13.

* cited by examiner

THERMAL MANAGEMENT SYSTEM, VEHICLE, AND THERMAL MANAGEMENT METHOD

CROSS-REFERENCE TO RELATED APPLICATION

This application is a continuation of International Application No. PCT/CN2022/092868, filed on May 13, 2022, which claims priority to Chinese Patent Application No. 202111137071.2 filed on Sep. 27, 2021, and Chinese Patent Application No. 202111138847.2 filed on Sep. 27, 2021. The disclosures of the aforementioned patent applications are hereby incorporated by reference in their entireties.

BACKGROUND

Technical Field

The present application relates to the technology field of vehicles and, in particular, a thermal management system, a vehicle and a thermal management method.

Description of Related Art

With the popularity of new energy vehicles, the importance of vehicle thermal management systems has become increasingly prominent. Compared with traditional fuel vehicles, the thermal management system of new energy vehicles has become more complex and has higher requirements.

At present, pure electric vehicles usually need to install many thermal management components, such as a water pump, a heat exchanger, a water-cooled condenser, a two-way solenoid valve, a two-way proportional valve and a cooling pipeline, according to the thermal management requirements of the whole vehicle. In order to enhance the range of electric vehicles, it has more and more requirements for the working condition design of the thermal management of the whole vehicle, and the number of components required in the thermal management system also increases accordingly. Due to the scattered arrangement of each component, the space occupied by the components after being installed on the vehicle is larger, and a large number of cooling pipelines need to be used to communicate between the dispersedly installed components to allow the cooling liquid to circulate between components, thereby meeting the thermal management requirements of the whole vehicle.

However, the use of a large number of cooling pipeline connections increases the length of the cooling pipeline in the entire system, and enlarges the flow resistance of the cooling liquid in the cooling pipeline, which lowers the working efficiency of the thermal management system.

SUMMARY

The present application provides a thermal management system, a vehicle and a thermal management method to solve the problems of using a large number of cooling pipeline connections in the prior art, which increases the length of the cooling pipeline in the entire system, increases the flow resistance of the cooling liquid in the cooling pipeline, and lowers the working efficiency of the thermal management system.

According to a first aspect of the present application, a thermal management system for a vehicle is provided. The thermal management system includes: a tank assembly, a valve unit, a radiator and a heat exchanger, where the tank assembly includes a shell body and a cover plate, the shell body covers the cover plate and forms an accommodation chamber together with the cover plate and the valve unit is installed on the shell body.

A plurality of pipelines for liquid circulation is disposed in the accommodation chamber, and the shell body has a plurality of connection ports communicating with the accommodation chamber, a first end of the pipeline communicates with the connection port in one-to-one correspondence, and a second end of the pipeline and a portion of the pipeline are located outside the accommodation chamber.

The valve unit has a plurality of valve ports, and the valve ports communicate with the connection ports in one-to-one correspondence. The valve unit includes a first multi-way valve and a second multi-way valve, and the plurality of valve ports includes a plurality of first-valve-ports and a plurality of second-valve-ports, the first-valve-ports are located at the first multi-way valve, and the second-valve-ports are located at the second multi-way valve; the radiator and the heat exchanger communicate with different pipelines, respectively.

According to a second aspect of the present application, a thermal management system for a vehicle is provided. The thermal management system includes: a tank assembly, a pump assembly, and a valve unit. The tank assembly includes a shell body and a cover plate, the shell body covers the cover plate and forms an accommodation chamber together with the cover plate, the pump assembly and the valve unit are each installed on the shell body.

A plurality of pipelines for liquid circulation is disposed in the accommodation chamber, and the shell body has a plurality of connection ports communicating with the accommodation chamber, a first end of the pipeline communicates with the connection port in one-to-one correspondence, and a second end of the pipeline and a portion of the pipeline are located outside the accommodation chamber.

The valve unit has a plurality of valve ports, and the valve ports communicate with the connection ports in one-to-one correspondence, and the valve units are configured for controlling a disconnection or connection between each connection port and its corresponding valve ports, so as to control the a disconnection or connection between the pipelines.

In a possible implementation, in the thermal management system provided by the present application, a side of the shell body facing away from the cover plate has a first installation region and a second installation region, and the plurality of connection ports include a plurality of first connection ports and a plurality of second connection ports, the first connection ports are located in the first installation region, and the second connection ports are located in the second installation region.

The valve unit includes a first multi-way valve and a second multi-way valve, and a plurality of valve ports include a plurality of first-valve-ports and a plurality of second-valve-ports, the first-valve-ports are located at the first multi-way valve, and the second-valve-ports are located at the second multi-way valve.

The first multi-way valve is connected in the first installation region, and the first connection ports communicate with the first-valve-ports in one-to-one correspondence; the second multi-way valve is connected in the second installation region, and the second connection ports communicate with the second-valve-ports in one-to-one correspondence.

In a possible implementation, in the thermal management system provided by the present application, a plurality of pipelines include a plurality of first pipelines, each first pipeline includes two first sub-pipelines, and a first end of one first sub-pipeline in each first pipeline corresponds to the first installation region, a second end of the one first sub-pipeline in each first pipeline is configured for communicating with a water outlet pipe of same component in a vehicle; a first end of the other first sub-pipeline in each first pipeline corresponds to the first installation region, and a second end of the other first sub-pipeline in the each first pipeline is configured for communicating with a water inlet pipe of same component in the vehicle.

The component includes at least one of a radiator, a battery cooler, and a motor cooler.

In a possible implementation, in the thermal management system provided by the present application, a plurality of pipelines include a second pipeline and a third pipeline, a first end of the second pipeline corresponds to the first installation region, and a first end of the third pipeline corresponds to the second installation region.

The second pipeline includes two second sub-pipelines, one second sub-pipeline in the second pipeline is configured for communicating with a water outlet pipe of a warm-air core body in a vehicle, and the other second sub-pipeline in the second pipeline communicates with a water inlet pipe of a heater in the vehicle.

The third pipeline includes two third sub-pipelines, one third sub-pipeline in the third pipeline is configured for communicating with a water outlet pipe of the heater, and the other third sub-pipeline in the third pipeline communicates with a water inlet pipe of the warm-air core body.

In a possible implementation, in the thermal management system provided by the present application, a water storage region is disposed in the accommodation chamber, and the water storage region is located above each pipeline.

The water storage region has a liquid replenishment port communicating with the pipeline.

In a possible implementation, the thermal management system provided by the present application further includes a water-cooled condenser and a heat exchanger, the water-cooled condenser is installed on a side of the shell body facing away from the cover plate and has a first inlet and a first outlet, the heat exchanger is installed on a side of the cover plate facing away from the shell body and has a second inlet and a second outlet.

The plurality of pipelines include two fourth pipelines, where a first end of one fourth pipeline corresponds to the second installation region and the one fourth pipeline communicates with the first inlet; and a first end of the other fourth pipeline corresponds to the first installation region, and the other fourth pipeline communicates with the first outlet.

The plurality of pipelines include two fifth pipelines, where first ends of the fifth pipelines each correspond to the first installation region, one fifth pipeline communicates with the second outlet, and the other fifth pipeline communicates with the second inlet.

In a possible implementation, the thermal management system provided by the present application further includes a gas-liquid separator, the cover plate has an installation part that is located outside the accommodation chamber, and the gas-liquid separator is installed on a side of the installation part facing the shell body, and is adjacent to the water-cooled condenser.

A refrigerant inlet of the gas-liquid separator communicates with a refrigerant outlet of the heat exchanger, and the gas-liquid separator is also configured for communicating with an outlet of an air-conditioning unit evaporator of the vehicle.

In a possible implementation, the thermal management system provided by the present application further includes an integration valve of air conditioner, which is installed on a side of the installation part facing away from the shell body, the integration valve of air conditioner is adjacent to the heat exchanger, and the integration valve of air conditioner communicates with a refrigerant inlet of the water-cooled condenser and a refrigerant inlet of the heat exchanger, respectively.

A refrigerant outlet of the water-cooled condenser communicates with the integration valve of air conditioner through a coaxial pipe.

A refrigerant outlet of the gas-liquid separator communicates with a suction port of the compressor of the vehicle through a coaxial pipe.

The coaxial pipe is also configured for communicating with an outlet of the condenser inside air-conditioning unit of the vehicle.

The integration valve of air conditioner is configured for communicating with an inlet of the condenser inside air-conditioning unit, and is also configured for communicating with an exhaust port of the compressor.

In a possible implementation, in the thermal management system provided by this application, the pump assembly includes a heating water pump, a battery water pump, and a motor water pump. The heating water pump, the battery water pump, and the motor water pump are each installed on a side of the shell body facing away from the cover plate. The heating water pump, the battery water pump and the motor water pump are connected with different pipelines located outside the accommodation chamber, respectively.

According to a third aspect of the present application, a vehicle is provided, including a vehicle body and a thermal management system installed on the vehicle body.

According to a fourth aspect of the present application, a thermal management method is provided, which uses a thermal management system, the method includes the following steps:

controlling communication between a first first-valve-port and a second first-valve-port in the first multi-way valve, where the first first-valve-port communicates with a liquid outlet of a motor cooling mechanism, the second first-valve-port communicates with a liquid inlet of the radiator, and a cooling liquid in the motor cooling mechanism flows into the radiator through the first first-valve-port and the second first-valve-port in turn;

controlling communication between a third first-valve-port and a fourth first-valve-port in the first multi-way valve, where a liquid outlet of the radiator communicates with the third first-valve-port, the fourth first-valve-port communicates with a liquid inlet of the motor cooling mechanism, and the cooling liquid flowing into the radiator flows into the motor cooling mechanism through the third first-valve-port and the fourth first-valve-port in turn after being cooled in the radiator.

In a possible implementation, the thermal management method provided by the present application further includes the following steps:

controlling communication between a fifth first-valve-port and a sixth first-valve-port in the first multi-way valve, where the fifth first-valve-port communicates with a liquid outlet of a battery cooling mechanism, and the sixth first-valve-port communicates with a liquid inlet of the heat exchanger, and a cooling liquid in the battery cooling mechanism flows into the heat exchanger through the fifth first-valve-port and the sixth first-valve-port in turn;

controlling communication between a seventh first-valve-port and an eighth first-valve-port in the first multi-way valve, where a liquid outlet of the heat exchanger communicates with the seventh first-valve-port, and the liquid inlet of the battery cooling mechanism communicates with the eighth first-valve-port, the cooling liquid flowing into the heat exchanger flows into the battery cooling mechanism through the seventh first-valve-port and the eighth first-valve-port in turn after being cooled in the heat exchanger.

In a possible implementation, the thermal management method provided by the present application further includes the following steps:

controlling communication between the third first-valve-port and the eighth first-valve-port in the first multi-way valve, where a cooling liquid flowing into the radiator flows into the battery cooling mechanism through the third first-valve-port and the eighth first-valve-port in turn after being cooled in the radiator;

controlling communication between the seventh first-valve-port and the fourth first-valve-port in the first multi-way valve, where the cooling liquid flowing into the heat exchanger flows into the motor cooling mechanism through the seventh first-valve-port and the fourth first-valve-port in turn after being cooled in the heat exchanger.

In a possible implementation, the thermal management method provided by the present application further includes the following steps:

controlling communication between the first first-valve-port and a ninth first-valve-port in the first multi-way valve, where the ninth first-valve-port communicates with the third first-valve-port, and the third first-valve-port communicates with the fourth first-valve-port, and the cooling liquid in the motor cooling mechanism flows into the motor cooling mechanism through the first first-valve-port, the ninth first-valve-port, the third first-valve-port and the fourth first-valve-port in turn;

controlling communication between the seventh first-valve-port and the eighth first-valve-port in the first multi-way valve, where the cooling liquid flowing out of the heat exchanger flows into the battery cooling mechanism through the seventh first-valve-port and the eighth first-valve-port in turn.

In a possible implementation, the thermal management method provided by the present application further includes the following steps:

controlling communication between the third first-valve-port and the eighth first-valve-port in the first multi-way valve, where the cooling liquid in the motor cooling mechanism flows into the battery cooling mechanism through the first first-valve-port, the ninth first-valve-port, the third first-valve-port and the eighth first-valve-port in turn;

controlling communication between the seventh first-valve-port and the fourth first-valve-port in the first multi-way valve, where the cooling liquid flowing out of the heat exchanger flows into the motor cooling mechanism through the seventh first-valve-port and the fourth first-valve-port in turn.

In a possible implementation, the thermal management method provided by the present application further includes the following steps:

a part of the cooling liquid flowing out of the battery cooling mechanism flows into a controller, and the cooling liquid flowing out of the controller flows into the heat exchanger.

In a possible implementation, in the thermal management method provided by the present application, the method further includes the following steps:

controlling communication between the seventh first-valve-port and the eighth first-valve-port in the first multi-way valve, where the cooling liquid in the battery cooling mechanism flows into the heat exchanger through the controller, and the cooling liquid flowing out of the heat exchanger flows into the battery cooling mechanism through the seventh first-valve-port and the eighth first-valve-port.

In a possible implementation, in the thermal management method provided by the present application, the method further includes the following steps:

controlling communication between a first second-valve-port and a second second-valve-port in the second multi-way valve, where the first second-valve-port communicates with a liquid outlet of the heater, the second second-valve-port communicates with a liquid inlet of the warm-air core body, and the liquid outlet of the warm-air core body communicates with a liquid inlet of the heater;

the cooling liquid flowing out of the heater flows into the heater through the first second-valve-port, the second second-valve-port and the warm-air core body in turn.

The present application provides a thermal management system, a vehicle, and a thermal management method. The thermal management system includes: a tank assembly and a valve unit, the tank assembly includes a shell body and a cover plate, the shell body covers the cover plate and forms an accommodation chamber together with the cover plate, the valve unit is installed on the shell body; a plurality of pipelines for liquid circulation is disposed in the accommodation chamber, the shell body has a plurality of connection ports communicating with the accommodation chamber, the first ends of the pipelines communicate with the connection ports in one-to-one correspondence, and the second ends of the pipelines and a portion of the pipeline are located outside the accommodation chamber; the valve unit has a plurality of valve ports, the valve ports communicate with the connection ports in one-to-one correspondence. By setting up the integrated tank assembly, each components of the thermal management system are integrated to install on the shell body and cover plate of the tank assembly, and the pipelines for cooling liquid circulation are integrated inside the accommodation chamber, thereby realizing the integration of the scattered installation components in the prior art into a module assembly. The highly integrated thermal management system not only effectively saves the installation space, but also saves a lot of pipelines, thereby reducing the flow resistance in the pipelines and improving the working efficiency of thermal management. It solves the problems of using a large number of cooling pipeline connections in the prior art, which leads to the increased length of the cooling pipeline in the entire system, increased flow resistance of the cooling liquid in the cooling pipeline, and lower working efficiency of the thermal management system.

BRIEF DESCRIPTION OF THE DRAWINGS

To illustrate the technical solutions in embodiments of the present application or the prior art more clearly, the following briefly introduces the accompanying drawings required for describing the embodiments or the prior art. Apparently, the accompanying drawings in the following description are some embodiments of the present application, and persons of ordinary skill in the art may still derive other drawings from these accompanying drawings without paying creative effort.

Figure 1:
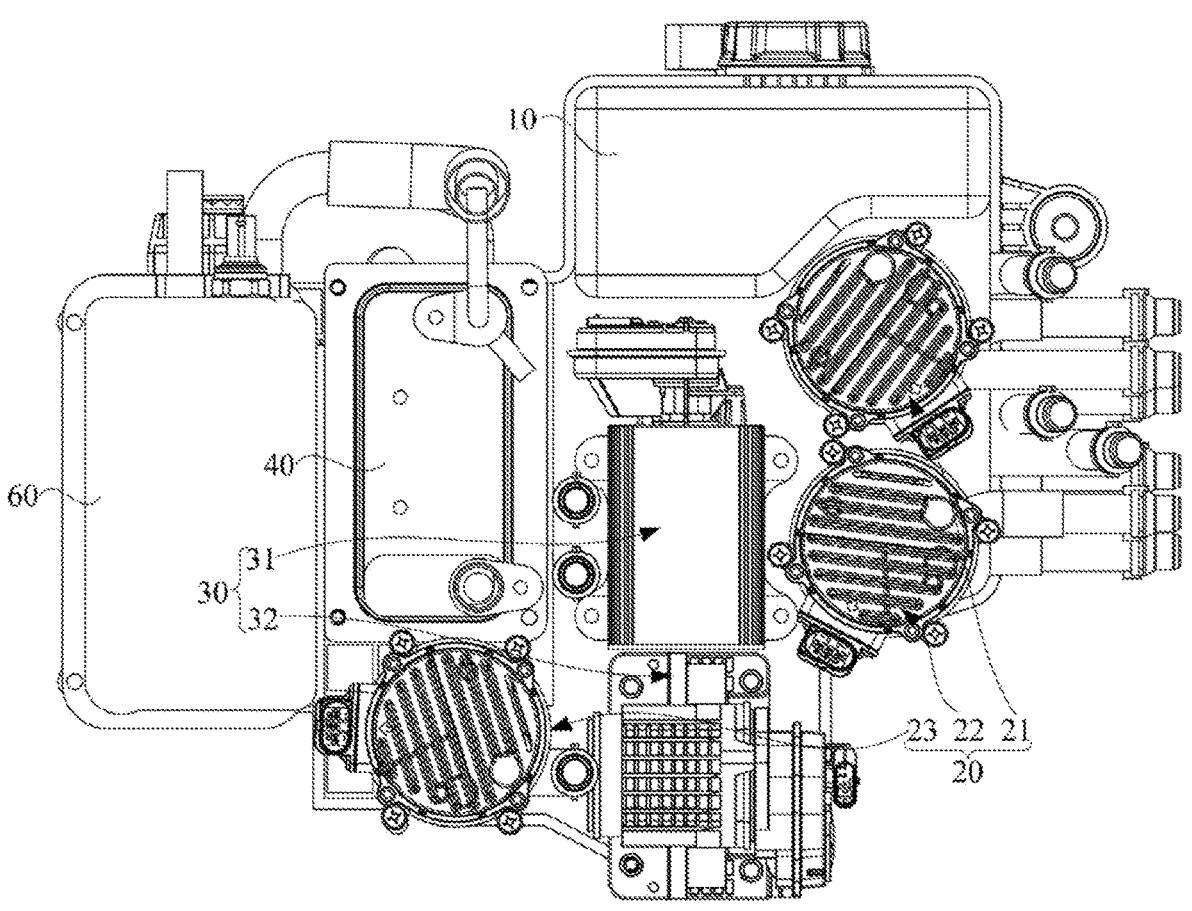

FIG. 1 is a structural schematic diagram of a thermal management system provided by the present application.

Figure 2:
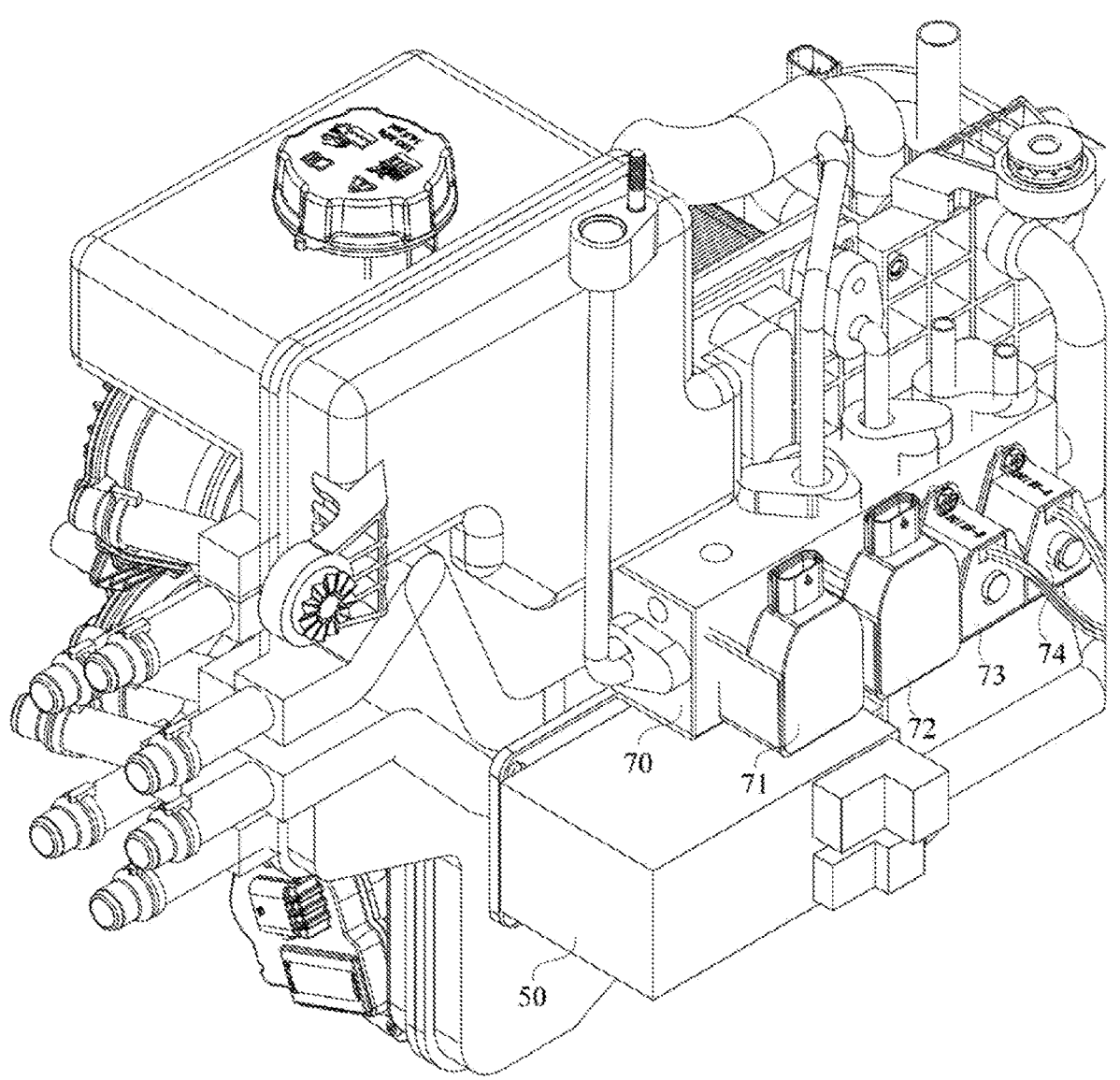

FIG. 2 is another structural schematic diagram of the thermal management system provided by the present application.

Figure 3:
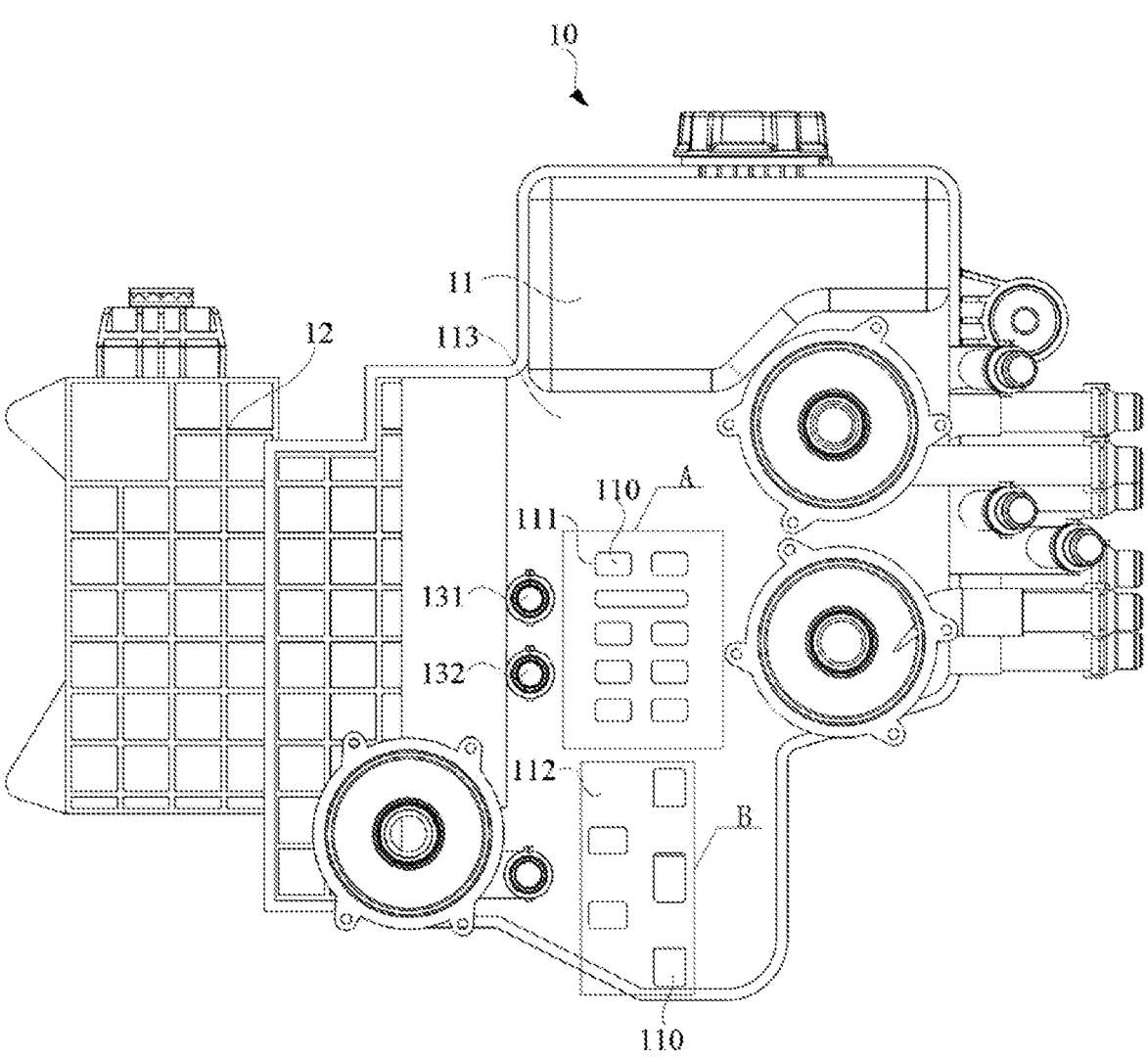

FIG. 3 is a structural schematic diagram of a tank assembly in the thermal management system provided by the present application.

Figure 4:
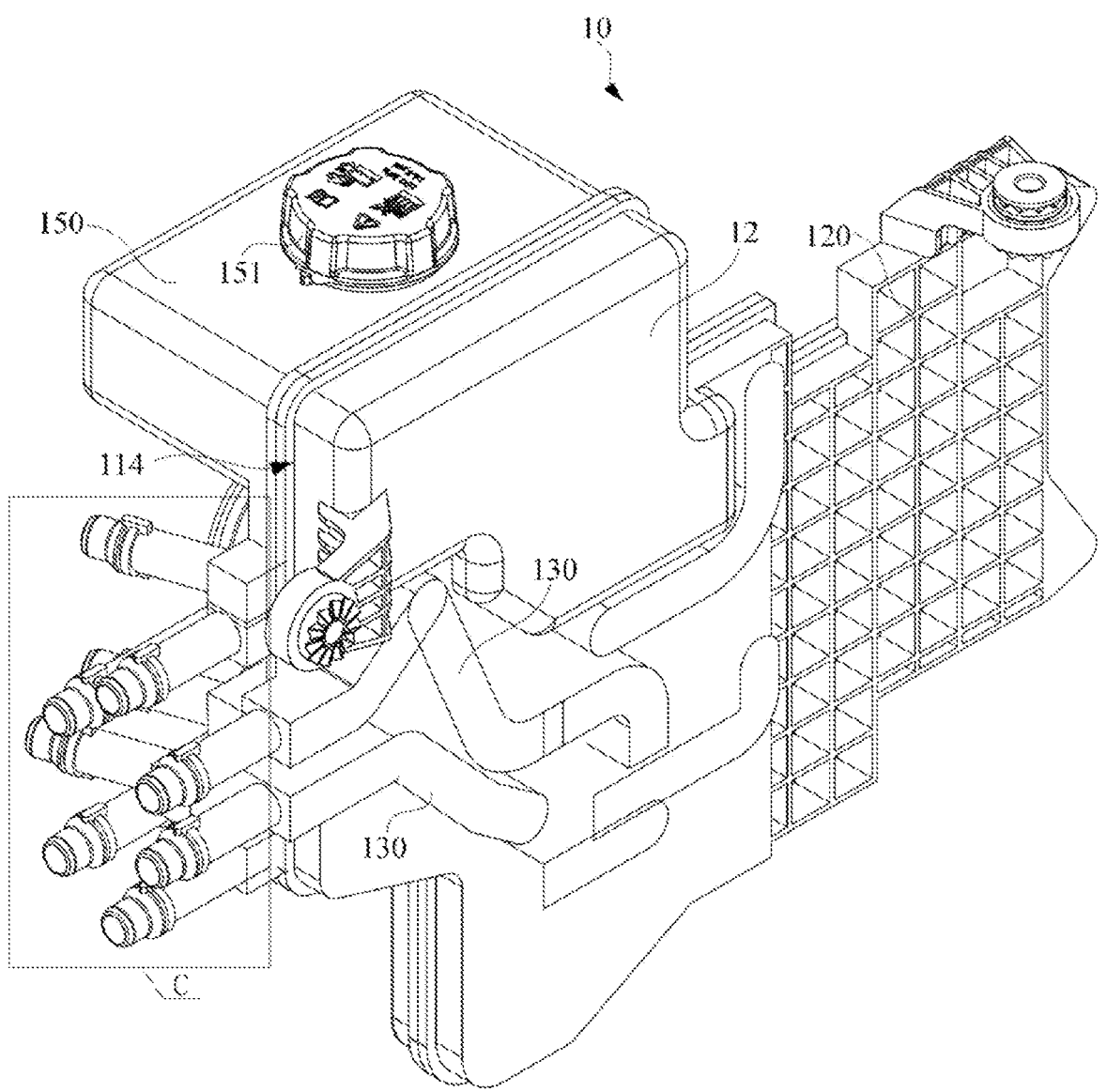

FIG. 4 is another structural schematic diagram of the tank assembly in the thermal management system provided by the present application.

Figure 5:
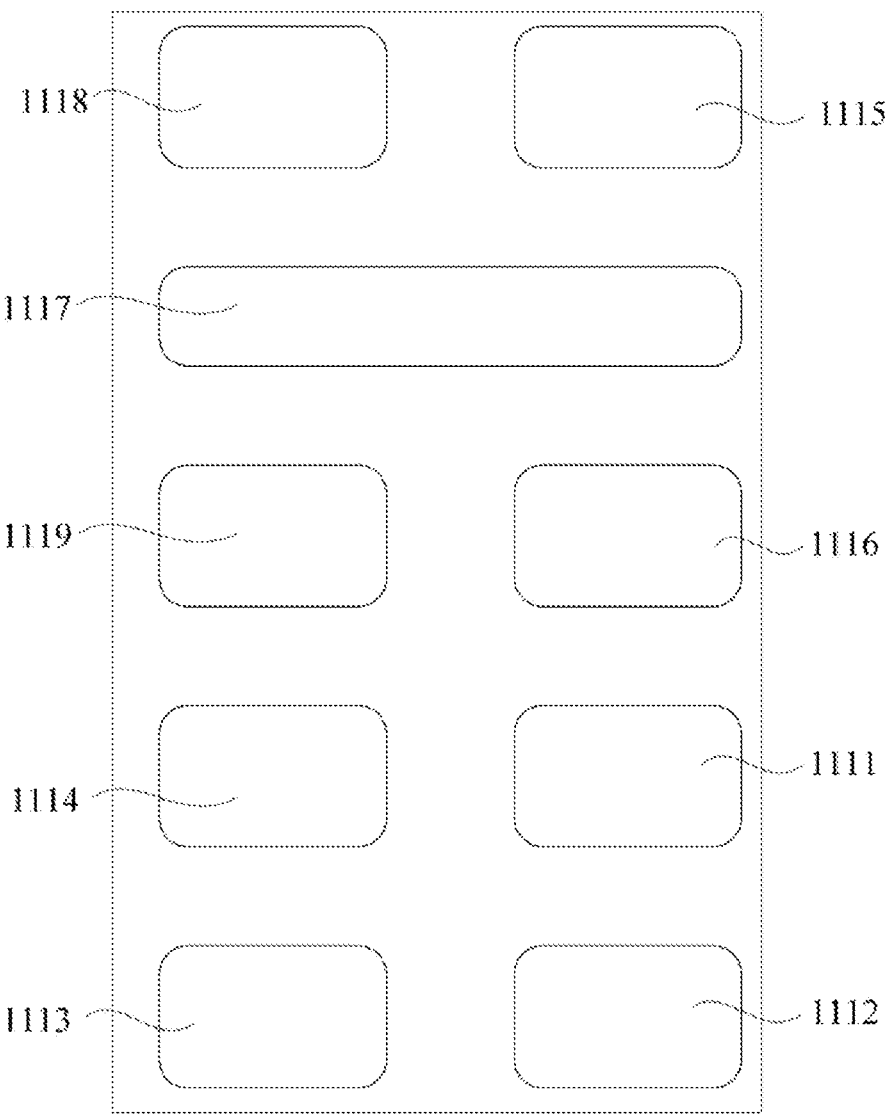

FIG. 5 is an enlarged schematic diagram at A in FIG. 3.

Figure 6:
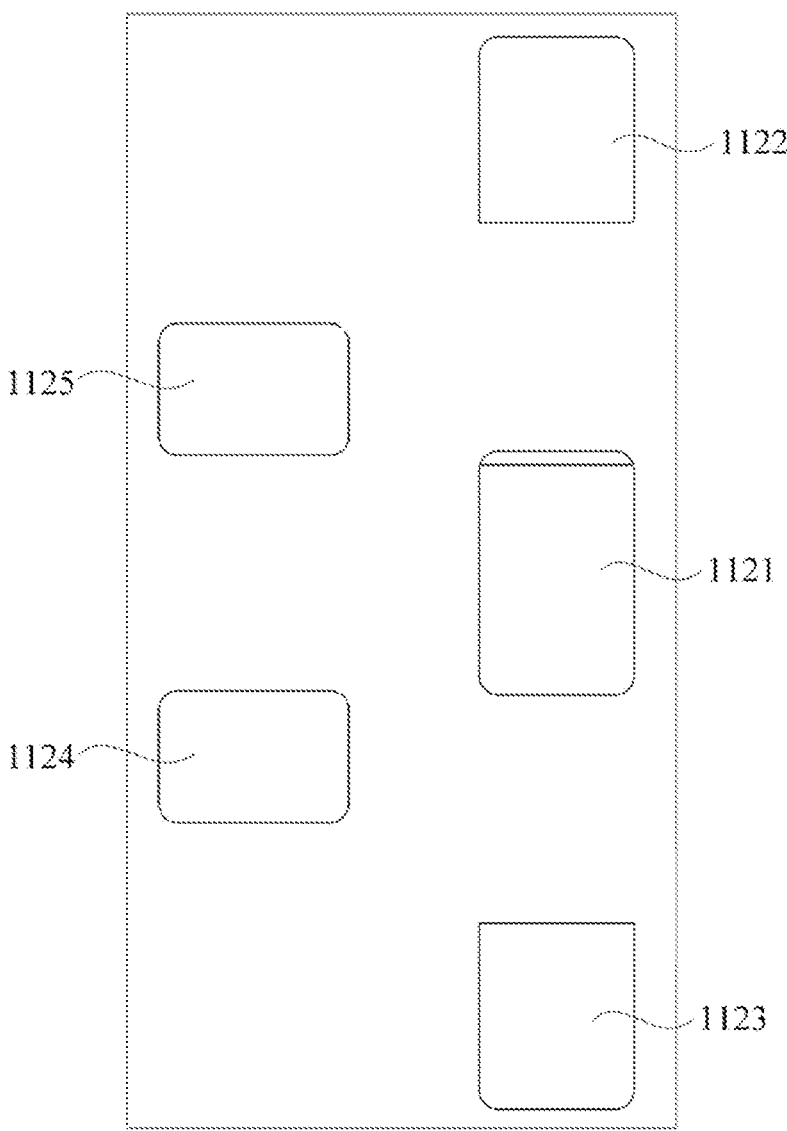

FIG. 6 is an enlarged schematic diagram at B in FIG. 3.

Figure 7:
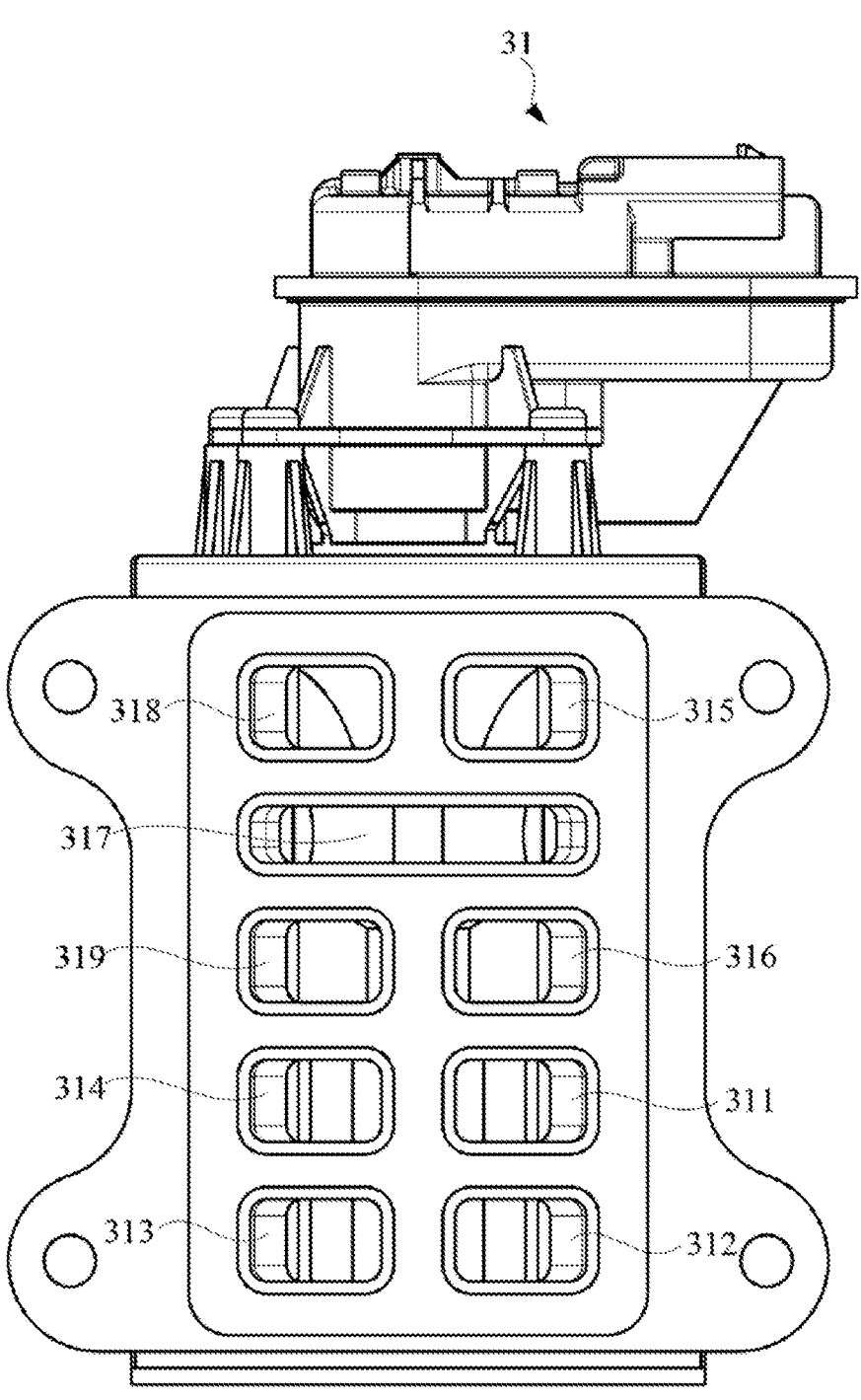

FIG. 7 is a structural schematic diagram of a first multi-way valve in the thermal management system provided by the present application.

Figure 8:
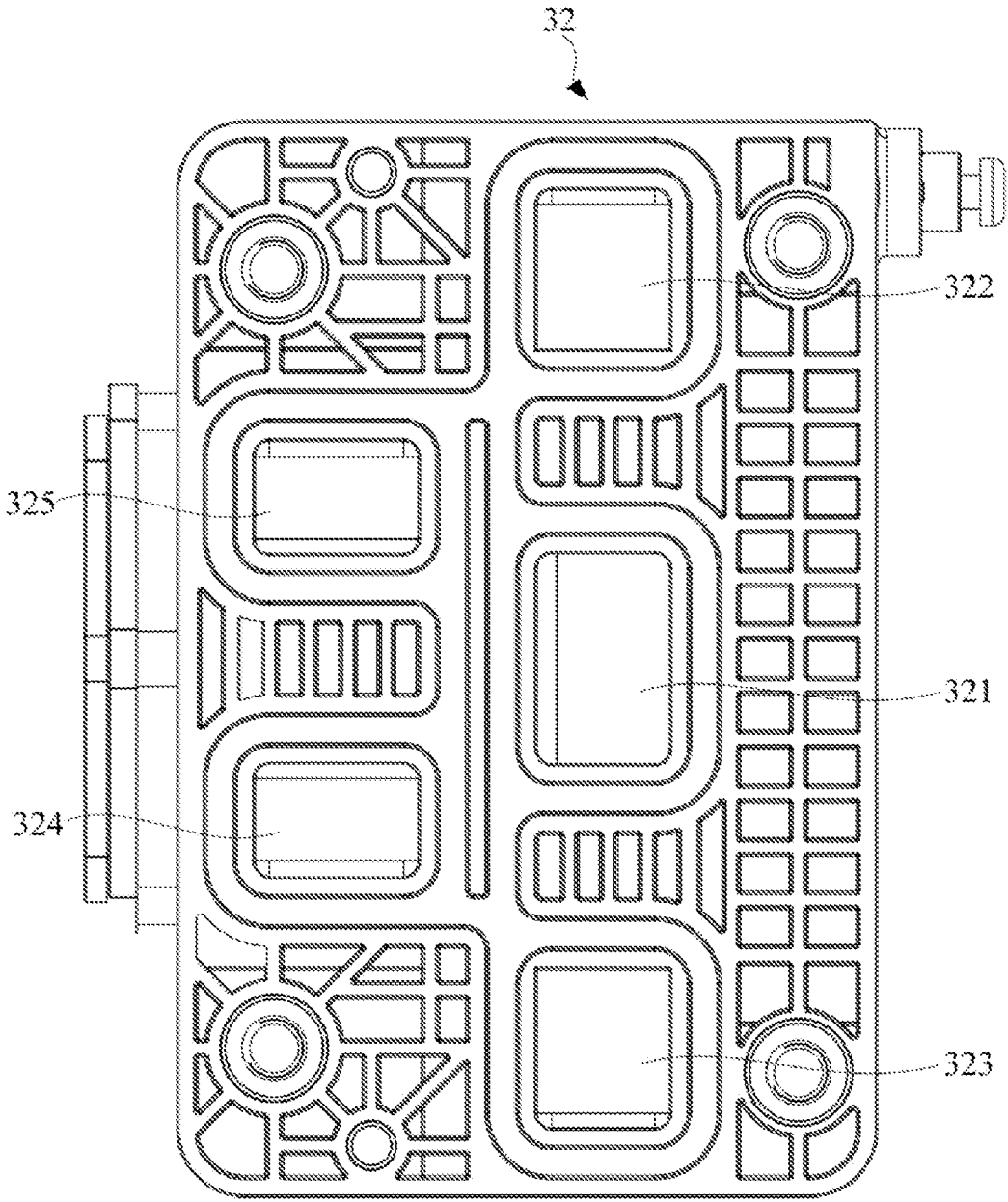

FIG. 8 is a structural schematic diagram of a second multi-way valve in the thermal management system provided by the present application.

Figure 9:
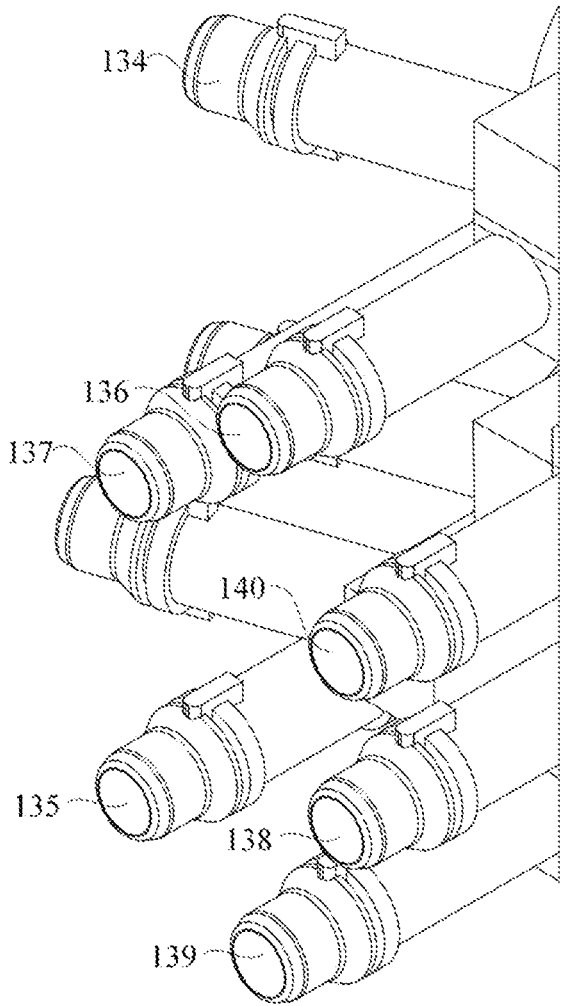

FIG. 9 is an enlarged schematic diagram at C in FIG. 4.

Figure 10:
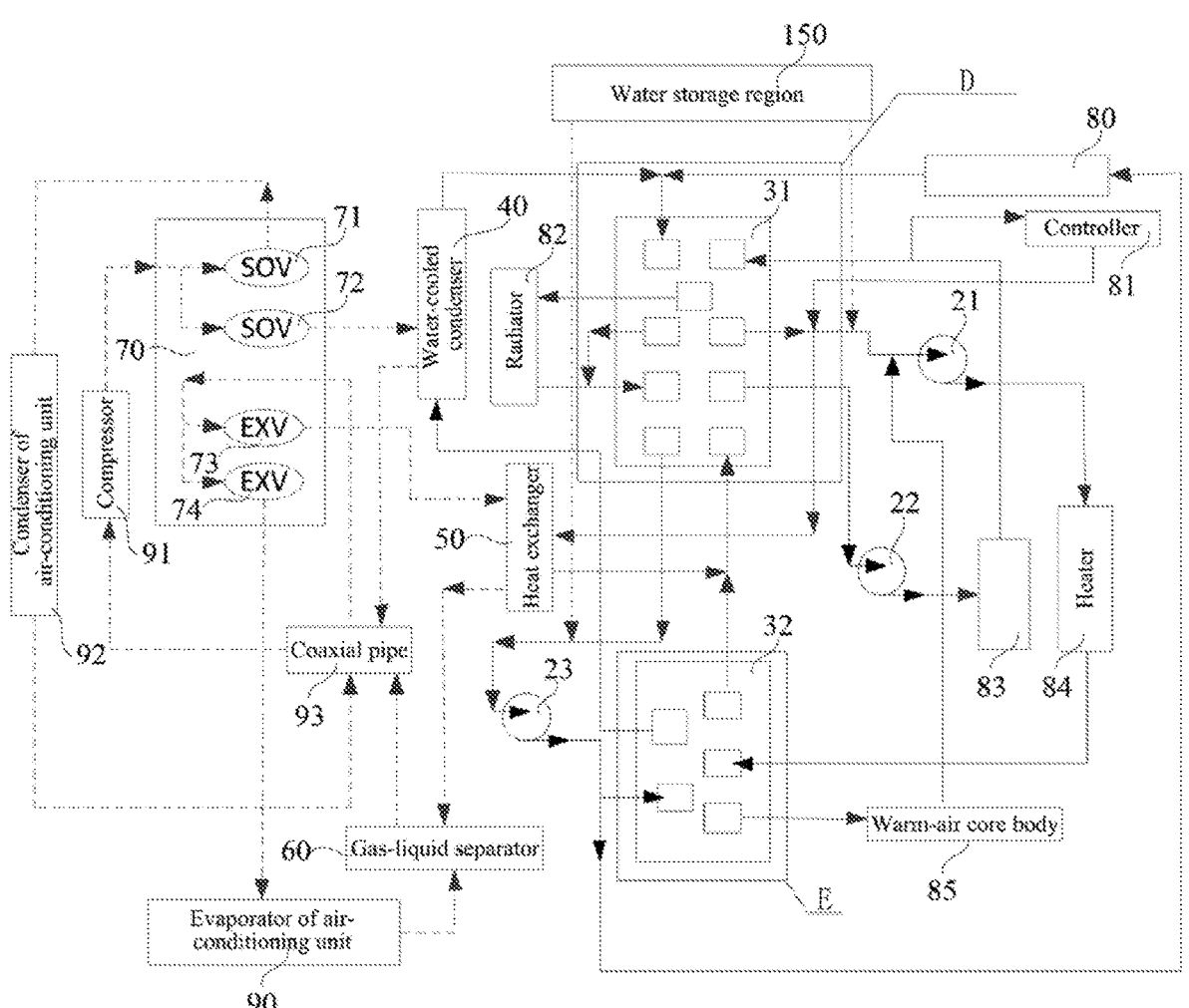

FIG. 10 is a schematic circulation diagram of the thermal management system provided by the present application.

Figure 11:
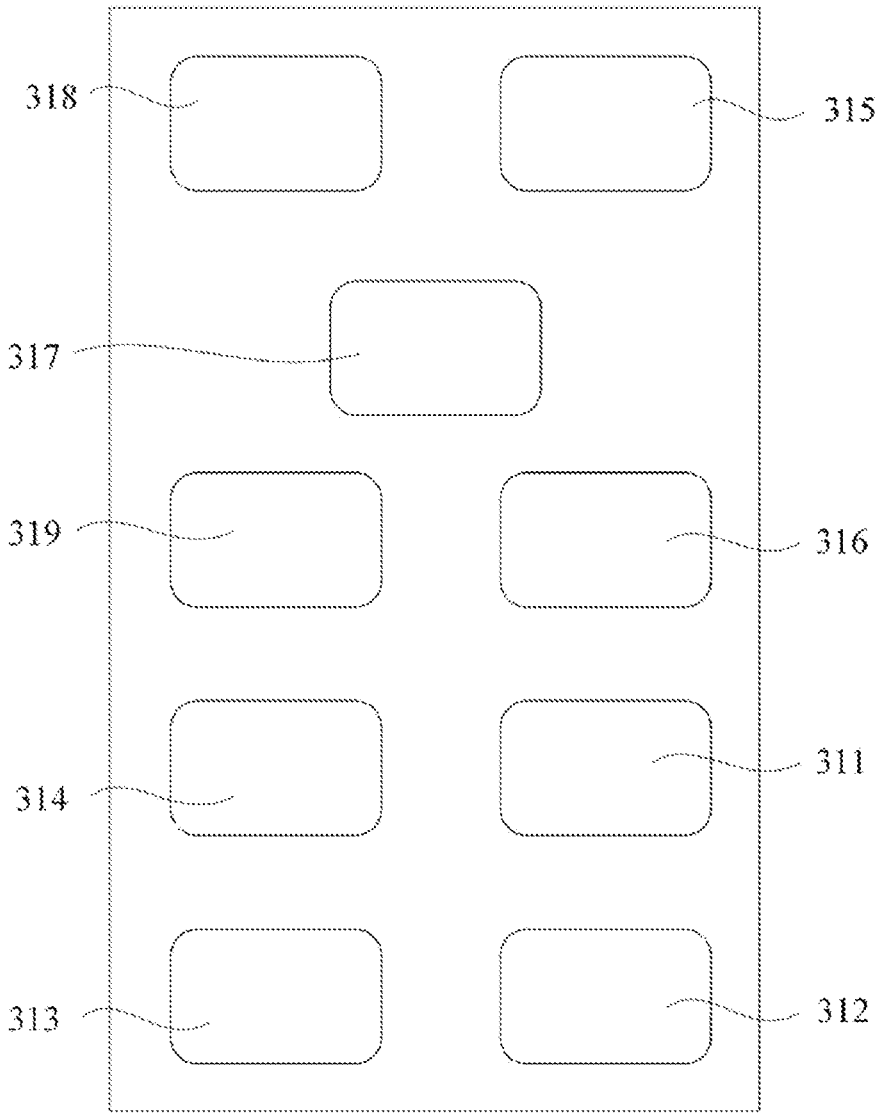

FIG. 11 is an enlarged schematic diagram at D in FIG. 10.

Figure 12:
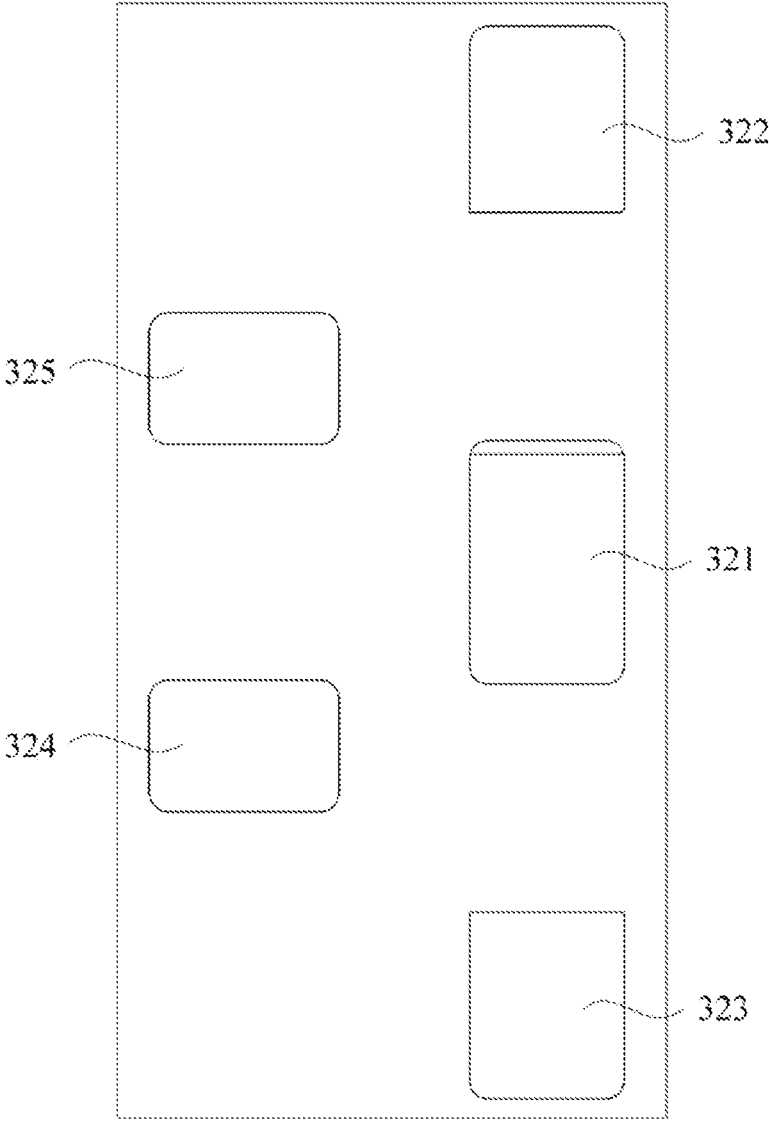

FIG. 12 is an enlarged schematic diagram at E in FIG. 10.

Figure 13:
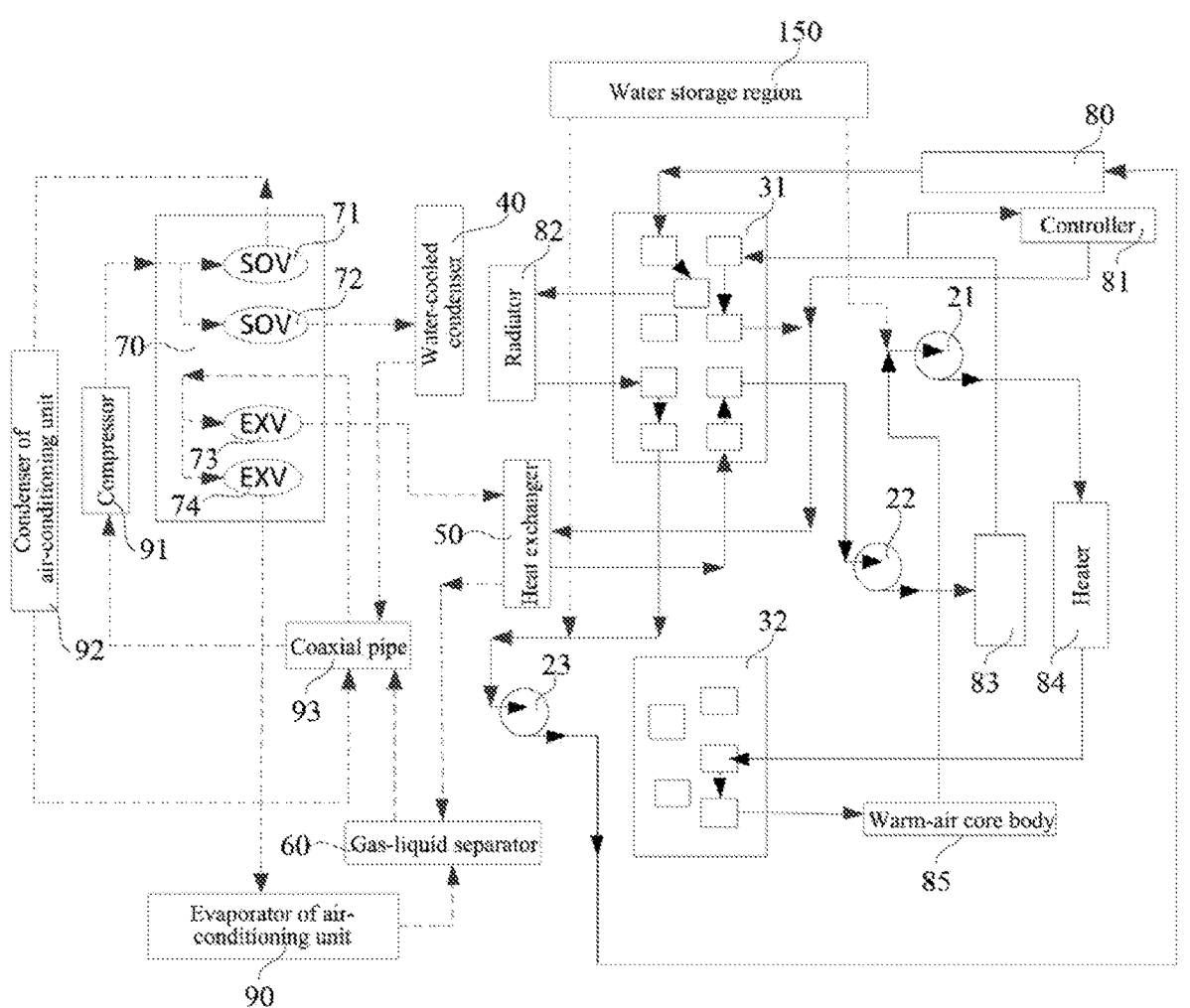

FIG. 13 is a schematic circulation diagram of a first working condition of the thermal management system provided by the present application.

Figure 14:
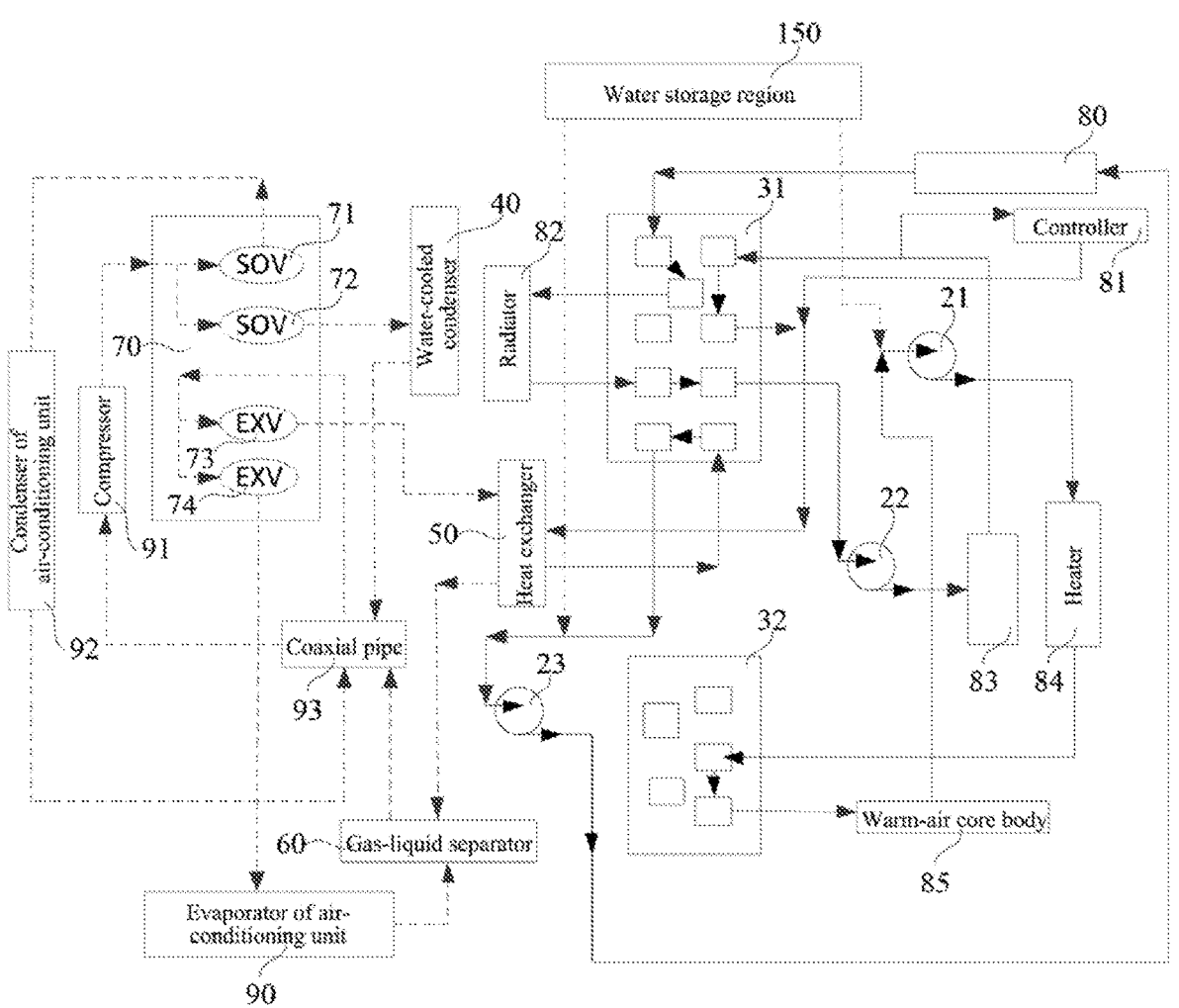

FIG. 14 is a schematic circulation diagram of a second working condition of the thermal management system provided by the present application.

Figure 15:
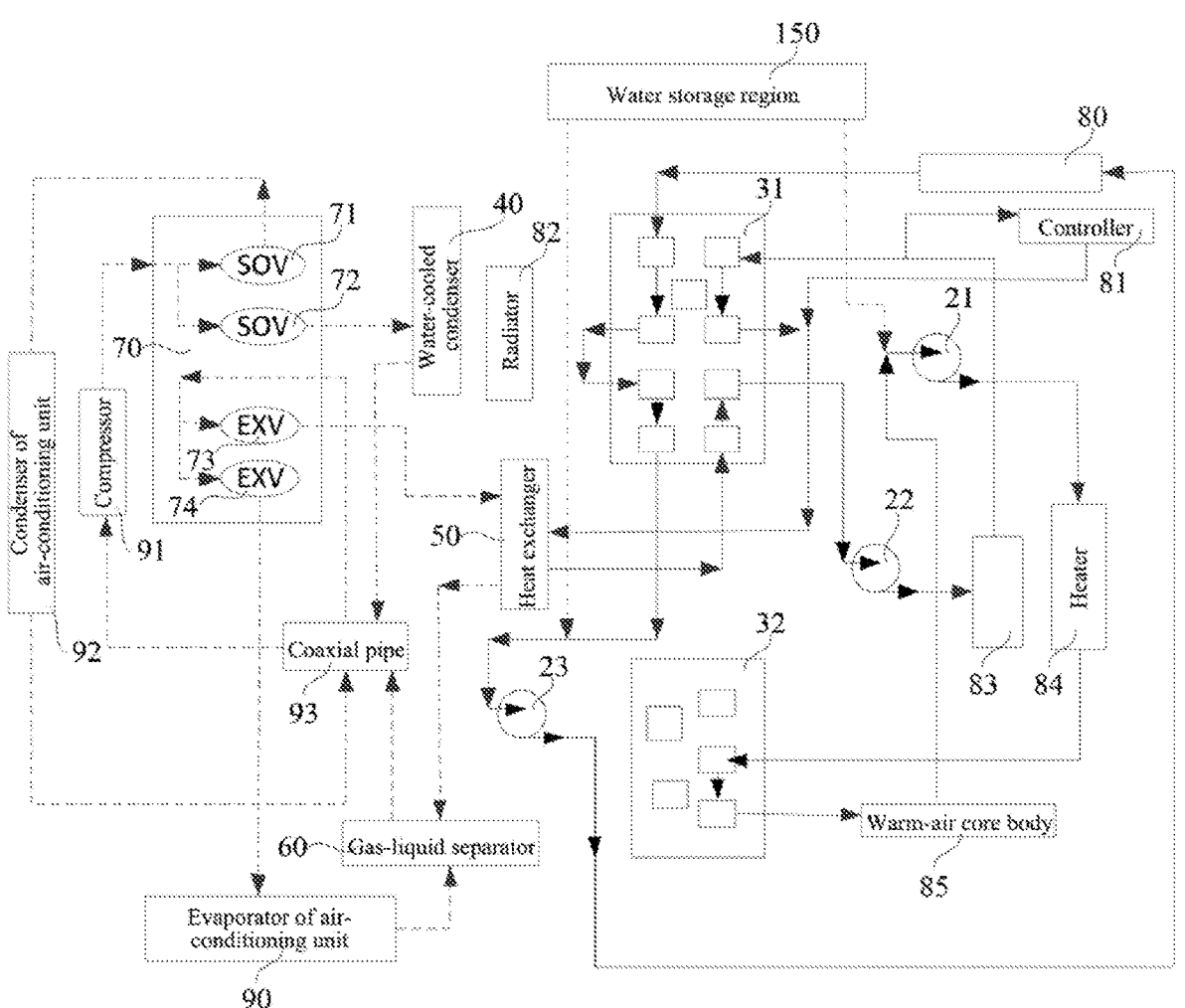

FIG. 15 is a schematic circulation diagram of a third working condition of the thermal management system provided by the present application.

Figure 16:
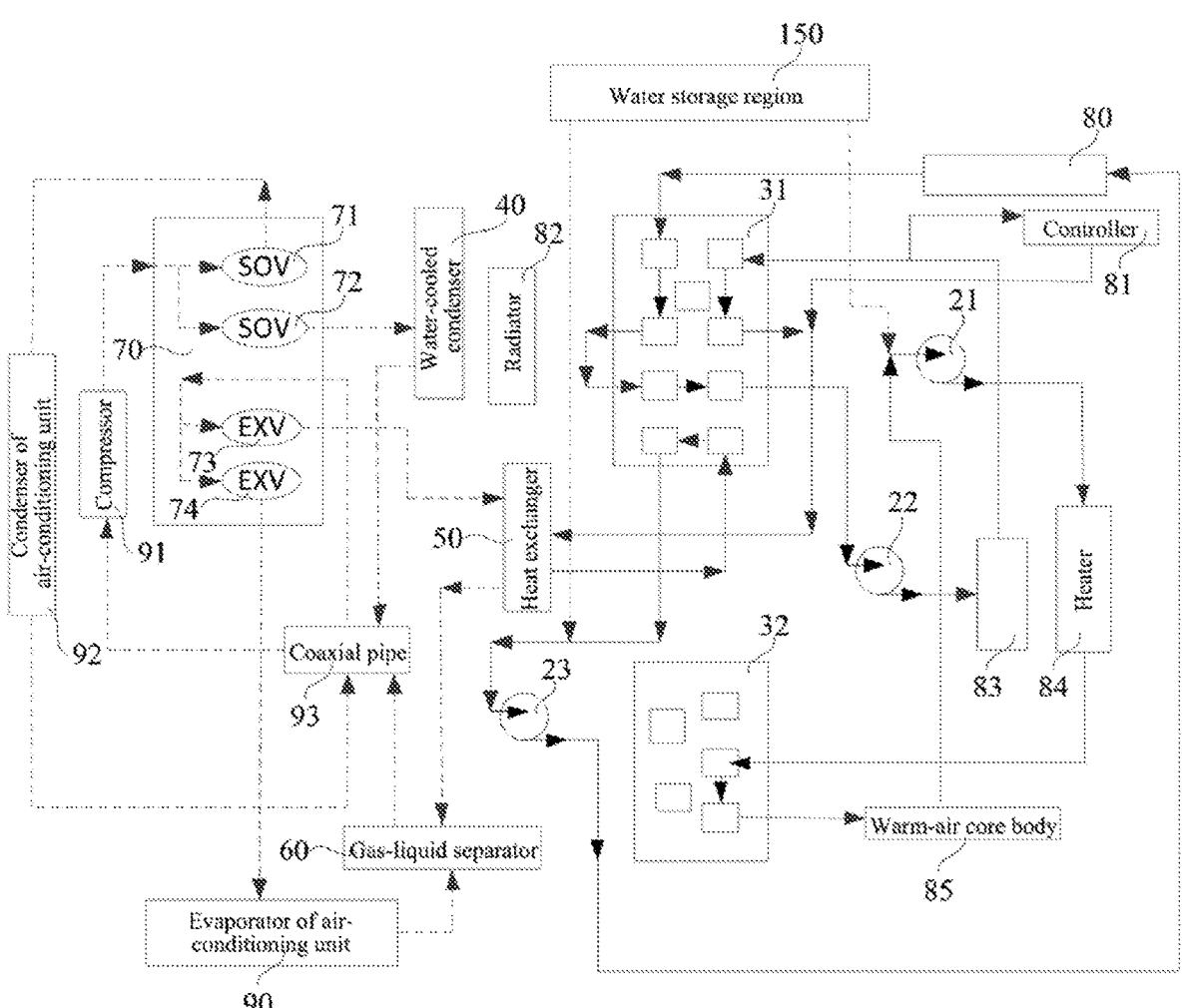

FIG. 16 is a schematic circulation diagram of a fourth working condition of the thermal management system provided by the present application.

Figure 17:
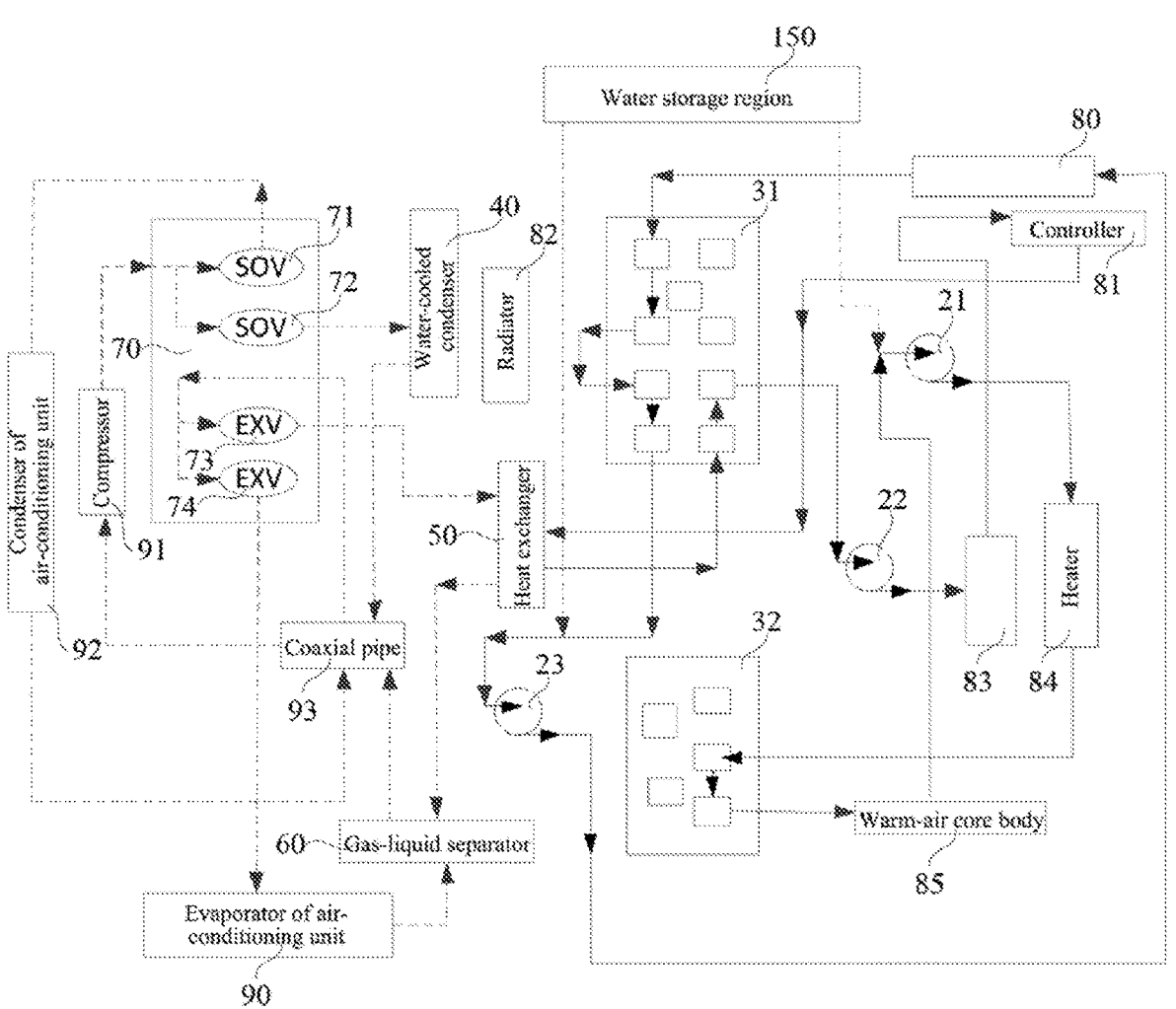

FIG. 17 is a schematic circulation diagram of a fifth working condition of the thermal management system provided by the present application.

Figure 18:
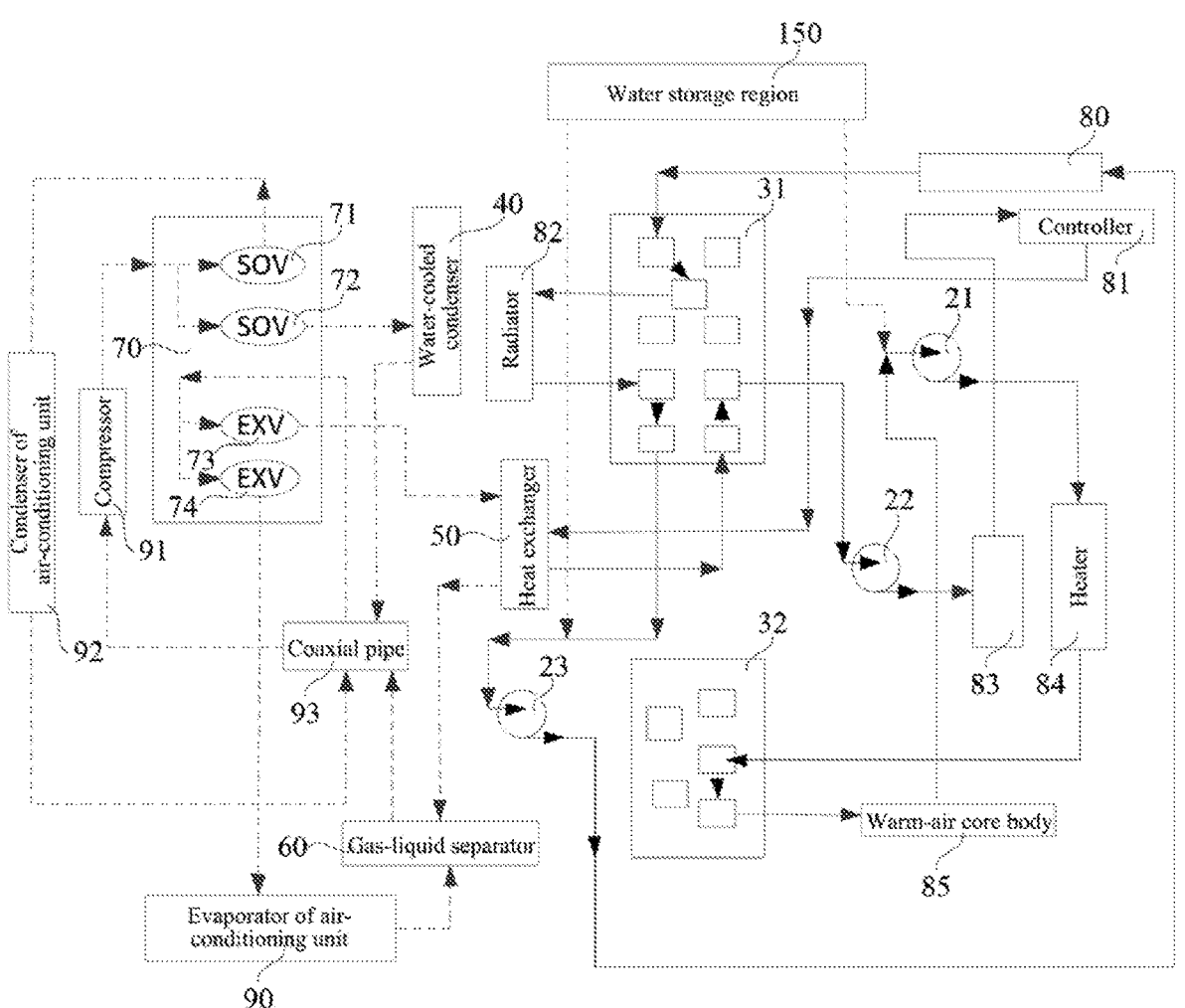

FIG. 18 is a schematic circulation diagram of a sixth working condition of the thermal management system provided by the present application.

Figure 19:
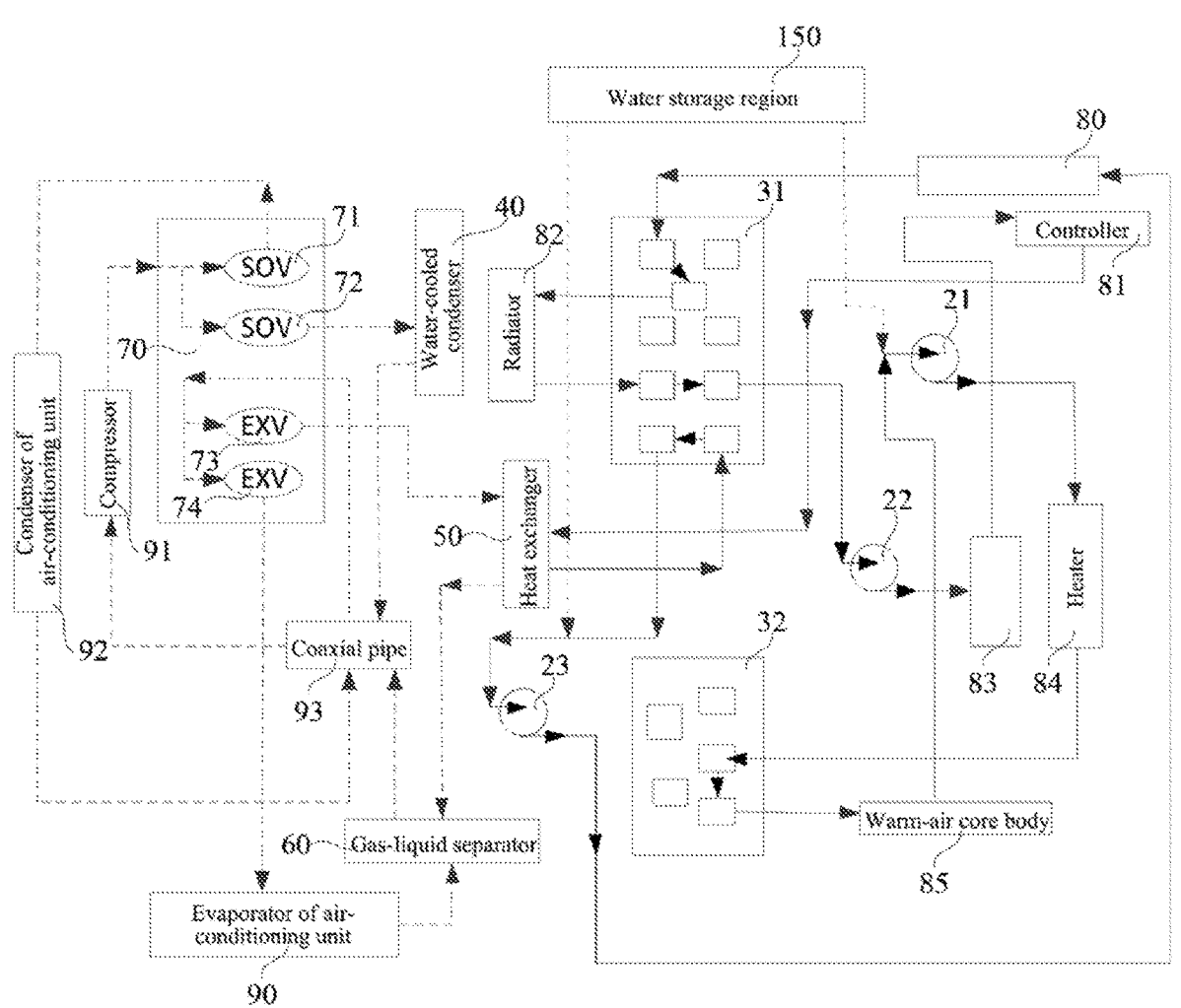

FIG. 19 is a schematic circulation diagram of a seventh working condition of the thermal management system provided by the present application.

DESCRIPTION OF REFERENCE NUMBERS in each schematic circulation diagram, the combination of solid line and arrow represents the flow direction of cooling liquid, the combination of dotted line and arrow represents the flow direction of refrigerant, and the combination of double-dot dash line and arrow represents the flow direction of cooling liquid replenishment;

10—tank assembly; 11—shell body; 12—cover plate; 110—connection port; 111—first installation region; 112—second installation region; 113—first surface; 114—first side; 120—installation part; 130—pipeline; 131—water inlet pipe of radiator; 132—water outlet pipe of radiator; 133—water inlet pipe of motor cooling mechanism; 134—water outlet pipe of motor cooling mechanism; 135—water inlet pipe of battery cooling mechanism; 136—water outlet pipe of battery cooling mechanism; 137—water inlet pipe of heater; 138—water outlet pipe of heater; 139—water inlet pipe of warm-air core body; 140—water outlet pipe of warm-air core body; 150—water storage region; 151—injection port;

1111—first connection port a; 1112—first connection port b, 1113—first connection port c; 1114—first connection port e; 1115—first connection port f; 1116—first connection port h; 1117—first connection port k; 1118—first connection port m; 1119—first connection port n; 1121—second connection port a; 1122—second connection port b; 1123—second connection port c; 1124—second connection port e; 1125—second connection port f;

20—pump assembly; 21—heating water pump; 22—battery water pump; 23—motor water pump;

30—valve unit; 31—first multi-way valve; 32—second multi-way valve;

311—first-valve-port a; 312—first-valve-port b; 313—first-valve-port c; 314—first-valve-port e; 315—first-valve-port f; 316—first-valve-port h; 317—first-valve-port k; 318—first-valve-port m; 319—first-valve-port n; 321—second-valve-port a; 322—second-valve-port b; 323—second-valve-port c; 324—second-valve-port e; 325—second-valve-port f;

40—water-cooled condenser;

50—heat exchanger;

60—gas-liquid separator;

70—integration valve of air conditioner; 71—first switch valve; 72—second switch valve; 73—first expansion valve; 74—second expansion valve;

80—motor cooling mechanism; 81—controller; 82—radiator; 83—battery cooling mechanism; 84—heater; 85—warm-air core body;

90—evaporator of air-conditioning unit; 91—compressor; 92—condenser of air-conditioning unit; 93—coaxial pipe.

DESCRIPTION OF THE EMBODIMENTS

To make the objectives, technical solutions, and advantages of embodiments of the present application clearer, the following clearly and comprehensively describes the technical solutions in embodiments of the present application with reference to the accompanying drawings in embodiments of the present application. Apparently, the described embodiments are merely a part rather than all embodiments of the present application. Based on the embodiments in the present application, all other embodiments obtained by persons of ordinary skill in the art without paying creative efforts fall within the protection scope of the present application.

In the description of the present application, it should be noted that, unless otherwise clearly stipulated and limited, the terms "installation", "connecting" and "connection" should be understood in a broad sense, for example, it can be fixed connection, or indirect connection through an intermediate, which may be the communication inside two elements or the interaction relationship between two elements. For persons of ordinary skill in the art, the specific meanings of the aforementioned terms in the present application can be understood according to specific situations.

In the description of the present application, it is can be understand that the orientation or positional relationship indicated by the terms "upper", "lower", "front", "rear", "vertical", "horizontal", "top", "bottom", "inside", "outside" and so on is based on the orientation or positional relationship shown in the drawings, and is only for the convenience of describing the present application and simplifying the description, rather than indicating or implying that the referred device or element must have a specific orientation, and construct and operate in a particular orientation, and therefore it should not be understood as limiting the application.

The terms "first", "second" and "third" (if any) in the description and claims of the present application and the aforementioned accompanying drawings are used to distinguish similar objects and not necessarily to describe a specific order or priority. It should be understood that the data used in this way are interchangeable under appropriate circumstances such that the embodiments of the present application described herein can, for example, be practiced in sequences other than those illustrated or described herein.

In addition, the terms "comprise" and "having", as well as any variations thereof, are intended to cover a non-exclusive inclusion. For example, a process, a method, a system, a product or a maintenance tool comprising a series of steps or units need not be limited to the expressly listed the steps or units, instead, other steps or elements not explicitly listed or inherent to the process, method, product or maintenance tool may be included.

With the popularity of new energy vehicles, the importance of vehicle thermal management systems has become increasingly prominent. Compared with traditional fuel vehicles, the thermal management system of new energy vehicles becomes more complex and has higher requirements.

According to the thermal management requirements of the whole vehicle, pure electric vehicles usually need to install many thermal management components, such as: an expansion water pump, a motor water pump, a battery water pump, a warm air water pump, a heat exchanger, a water-cooled condenser, a water temperature sensor, a four-way solenoid valve, a three-way solenoid valve, a two-way solenoid valve, a two-way proportional valve, a three-way proportional valve, a cooling connection pipeline, an air conditioner gas-liquid separator, an air conditioner EXV (Electric Expansion Valve) valve, an air conditioner SOV (Solenoid Operated Valve) valve, an air conditioner connection pipeline, etc. At present, in order to further enhance the cruising range of electric vehicles, there are more and more requirements for the design of working conditions for the thermal management of the whole vehicle, and the number of components requiring the thermal management also increases accordingly. Due to the scattered arrangement of each component in the thermal management system, the thermal management system will occupy a large installation space in the vehicle, and the scattered components need to use a large number of cooling pipelines and circulate pipelines for communication between them, thereby meeting the vehicle's demand for the thermal management of the components.

However, the use of a large number of cooling pipeline connections increases the length of the cooling pipeline in the entire system, increases the flow resistance of the cooling liquid in the cooling pipeline, and lowers the working efficiency of the thermal management system.

Based on this, the present application provides a thermal management system, a vehicle and a thermal management method. Through the integrated design of parts and components in the thermal management system of the vehicle, thereby saving the length of the pipelines in the thermal management system, and enhancing the working efficiency of the thermal management system.

Embodiment

FIG. 1 is a structural schematic diagram of a thermal management system provided by the present application, FIG. 2 is another structural schematic diagram of the thermal management system provided by the present application, FIG. 3 is a structural schematic diagram of the tank assembly in the thermal management system provided by the present application, and FIG. 4 is another structural schematic diagram of the tank assembly in the thermal management system provided by the present application.

As shown in FIG. 1 and FIG. 2, the thermal management system provided by the embodiment of the present application includes: a tank assembly 10, a pump assembly 20, and a valve unit 30. As shown in FIG. 3 and FIG. 4, the tank assembly 10 includes a shell body 11 and a cover plate 12. The shell body 11 covers the cover plate 12 and forms an accommodation chamber (not shown in the figure) together with the cover plate 12. The pump assembly 20 and the valve unit 30 are installed on the shell body 11, respectively; the accommodation chamber is internally provided with a plurality of pipelines 130 for liquid circulation, and the shell body 11 has a plurality of connection ports 110 in communication with the accommodation chamber. A first end of the pipeline 130 communicates with the connection port 110 in one-to-one correspondence, and a second end of the pipeline 130 and a portion of the pipeline 130 are located outside the accommodation chamber; the valve unit 30 has a plurality of valve ports (not shown in the figure), and the valve ports communicate with the connection ports 110 in one-to-one correspondence. The valve unit 30 is used for controlling the disconnection or connection between the connection port 110 and the valve port corresponding to the connection port 110, thereby controlling the disconnection or connection between the pipelines.

The tank assembly 10 is the core component of the thermal management system, and it has multiple functions. The tank assembly 10 can not only provide cooling liquid for cooling and reducing temperature to each component in the thermal management system, but also provide fixed support to each part and component, so as to integrate the dispersed components into an integrated thermal management module, so that an arrangement of respective components is more compact, thereby reducing the installation space of the thermal management system on the vehicle body.

Continuing to refer to FIG. 3 and FIG. 4, the tank assembly 10 includes a shell body 11 and a cover plate 12. The shell body 11 has a first surface 113 and a second surface (not shown in the figure) opposite to the first surface 113, the second surface of the shell body 11 is covered with the cover plate 12, and the shell body 11 is connected with the cover plate 12 by a hot plate welding process to form the accommodation chamber together with the cover plate 12.

Continuing to refer to FIG. 1 and FIG. 3, the pump assembly 20 and the valve unit 30 are each fixedly installed on the first surface 113 of the shell body 11.

Continuing to refer to FIG. 3 and FIG. 4, a plurality of pipelines 130 for the circulation of the cooling liquid are provided inside the accommodation chamber of the tank assembly 10, and the pipelines 130 are used for communicating with various components in the thermal management system and delivering cooling liquid to the corresponding components. A plurality of connection ports 110 are disposed in the first surface 113 of the shell body 11, and each connection port 110 communicates with the accommodation chamber. A first end of the pipeline 130 communicates with the connection port 110 in one-to-one correspondence, a second end of the pipeline 130 is located outside the accommodation chamber with a portion of the pipeline 130 after protruding from the accommodation chamber, and the second end of the pipeline 130 is used for communicating with the component installed on the shell body 11 to deliver the cooling liquid.

In the present application, after various parts and components in the thermal management system are integrally installed on the shell body 11, the overall arrangement of the thermal management system becomes more compact, and the distance between various components also greatly reduced. Furthermore, setting the pipelines 130 for communicating between various components to be inside the accommodation chamber, may not only optimize the spatial arrangement of the overall system, but also greatly shorten the total length of the pipeline 130, thereby effectively reducing the internal resistance of the pipeline 130, and improving the working efficiency of the thermal management system.

The valve unit 30 is provided with a plurality of valve ports, which are communicated with the connection ports 110 in one-to-one correspondence. Each pipeline 130 communicates with the valve unit 30, and the cooling liquid flows into various components after passing through the valve unit 30. The valve unit 30 is configured for controlling the disconnection or connection between the connection port 110 and the corresponding valve port communicating with the connection port 110, thereby controlling the disconnection or connection between the pipelines 130 where various connection ports 110 are located, and then controlling the flow rate of the cooling liquid input to the components connected to various pipelines 130.

The valve unit 30 and the pipelines 130, which are installed in the thermal management system, are connected in series to form closed cooling loops. The opening and closing of different cooling loops is controlled by the valve unit 30, thereby meeting the requirements of various components for cooling liquid and improving the working efficiency of the overall thermal management system.

In the present application, by setting up the integrated tank assembly 10, each component in the thermal management system is integrally installed on the shell body 11 and the cover plate 12 in the tank assembly 10, and the pipeline 130 for cooling liquid circulation is integrated inside the accommodation chamber, thereby realizing the integration of the scattered installation components in the prior art into a module assembly. The highly integrated thermal management system not only effectively saves the installation space and unifies the external connection ports of the pipelines 130 to make the arrangement of the pipelines 130 more compact, but also saves a large number of pipelines 130, reduces the flow resistance in the pipelines 130 and improves the working efficiency of thermal management. It solves the problems of using a large number of cooling pipeline connections in the prior art, which leads to the increased length of the cooling pipeline in the entire system, increased flow resistance of the cooling liquid in the cooling pipeline, and lower working efficiency of the thermal management system.

Continuing to refer to FIG. 3, a side of the shell body 11 facing away from the cover plate 12 has a first installation region 111 and a second installation region 112, a plurality of connection ports 110 includes a plurality of first connection ports (not shown in the figure) and a plurality of second connection ports (not shown in the figure). The first connection port is located in the first installation region 111, and the second connection port is located in the second installation region 112. The side of the shell body 11 facing away from the cover plate 12 is the first surface 113 of the shell body 11, and the first surface 113 is provided with a first installation region 111 and a second installation region 112 for installing a valve assembly.

FIG. 5 is an enlarged schematic diagram at A in FIG. 3, and FIG. 6 is an enlarged schematic diagram at B in FIG. 3.

As shown in FIG. 3, FIG. 5 and FIG. 6, nine first connection ports are provided in the first installation region 111, which are: a first connection port a 1111, a first connection port b 1112, a first connection port c 1113, a first connection port e 1114, a first connection port f 1115, a first connection port h 1116, a first connection port k 1117, a first connection port m 1118, and a first connection port n 1119, respectively. The five second connection ports are provided in the second installation region 112, which are: a second connection port a 1121, a second connection port b 1122, a second connection port c 1123, a second connection port e 1124, and a second connection port f 1125, respectively.

FIG. 7 is a structural schematic diagram of a first multi-way valve in the thermal management system provided by the present application, FIG. 8 is a structural schematic diagram of a second multi-way valve in the thermal management system provided by the present application, and FIG. 9 is an enlarged schematic diagram at C in FIG. 4.

As shown in FIG. 1, FIG. 7 and FIG. 8, the valve unit 30 includes a first multi-way valve 31 and a second multi-way valve 32, and the plurality of valve ports includes a plurality of first-valve-ports (not shown in the figure) and a plurality of second-valve-ports (not shown in the figure), where, the first-valve-ports are located on the first multi-way valve 31, and the second-valve-ports are located on the second multi-way valve 32.

Specifically, the first multi-way valve 31 includes a valve seat (not shown in the figure) and a valve core (not shown in the figure) rotatably disposed in the valve seat. The valve core has a plurality of rotating positions. The valve seat is provided with the plurality of first-valve-ports, and the valve core is provided with conduction structure groups respectively corresponding to various first-valve-ports. Each conduction structure group includes a plurality of conduction structures disposed along the circumferential direction; and the conduction structure group is configured as follows: when the valve core rotates to different rotating positions, different conduction structures in the conduction structure group cooperate with corresponding first-valve-ports, so that the first-valve-ports form different conduction states.

The valve core is rotatably disposed on the valve seat, and the valve seat is provided with a plurality of first-valve-ports. The conduction structure group corresponding to the first-valve-port is disposed on the valve core, and further includes a plurality of conduction structures disposed along the circumferential direction. When the valve core rotates to different rotation positions, different first-valve-ports form different conduction states. Only one valve core is required.

The first multi-way valve 31 may be a nine-way solenoid valve configured for controlling the disconnection or connection of each pipeline 130 connected to it. The nine-way solenoid valve is provided with nine first-valve-ports, which are: a first-valve-port a 311, a first-valve-port b 312, a first-valve-port c 313, a first-valve-port e 314, a first-valveport f 315, a first-valve-port h 316, a first-valve-port k 317, a first-valve-port m 318, a first-valve-port n 319, respectively.

The second multi-way valve 32 includes a valve seat, a first valve core (not shown in the figure), a second valve core (not shown in the figure) and a driving device (not shown in the figure). The driving device is connected to the first valve core in a transmission manner; the first valve core is provided with a first matching structure, and the second valve core is provided with a second matching structure matching with the first matching structure. There is a first mating state and a second mating state between the first matching structure and the second matching structure, where, in the first mating state, the first valve core rotates independently, and the second valve core remains stationary; and in the second mating state, the first valve core drives the second valve core to rotate synchronously.

The valve seat is provided with a plurality of second-valve-ports corresponding to the first valve core, and the valve core is provided with a first conduction structure, and the first conduction structure is configured for communicating at least two second-valve-ports when the first valve cores turn to a first predetermined position. The valve seat is provided with a plurality of second-valve-ports corresponding to the second valve, and the second valve core is provided with a second conduction structure, and the second conduction structure is configured for communicating at least two second-valve-ports when the two valve cores turn to the second predetermined position.

The driving device is connected with the first valve core in a transmission manner. When the first valve core rotates, the first matching structure of the first valve core can drive the second valve core to rotate by the second matching structure. In this way, the first valve core can rotate independently, and the flow rate of the first valve core may be adjusted by changing the corresponding angle between the first-valve-port and the first conducting structure. When the first valve core rotates, it drives the second spool to rotate; and by changing the corresponding angle between the second-valve-port and the second conduction structure, the flow rate of the second valve core may be adjusted, and the first-valve-port rotates to the original position again, without changing the flow of the first valve core. Only one drive device is required to drive and control the first valve core and the second valve core.

The driving device includes a motor (not shown in the figure) and a gear set (not shown in the figure) connected to the motor in a transmission manner, and the gear set is connected to the first valve core in a transmission manner A worm (not shown in the figure) is disposed on the motor shaft. The gear set includes a first worm gear cooperating with the worm, a second worm gear engaged with the first worm gear, a third worm gear engaged with the second worm gear, a first gear connected to the bottom of the third worm gear, and a second gear engaged with the first gear. The central axes of the first worm gear, the second worm gear, the third worm gear, the first gear and the second gear in the gear set are parallel to each other and are all disposed along the vertical direction, and the central axis of the first worm and the central axis of the first worm gear are perpendicular to each other. The worm disposed on the motor shaft rotates and drives the first valve core to rotate through the transmission of the gear set, thereby ensuring the stability of transmission.

The type of the motor is not limited, and for control simplicity and high precision, in a possible implementation, the motor is a stepper motor or a servo motor.

The second multi-way valve 32 is a five-way solenoid valve, and the five-way solenoid valve is configured for controlling the opening size of various pipelines 130 connected thereto, thereby controlling the flow rate of the cooling liquid flowing through the pipelines 130. The five-way solenoid valve is provided with five second-valve-ports, which are: a second-valve-port a 321, a second-valve-port b 322, a second-valve-port c 323, a second-valve-port e 324, and a second-valve-port f 325, respectively.

Continuing to refer to FIG. 1 and FIG. 3, the first multi-way valve 31 is connected in the first installation region 111, and the first-valve-port communicates with the first connection port in one-to-one correspondence. The second multi-way valve 32 is connected in the second installation region 112, and the second-valve-port communicates with the second connection port in one-to-one correspondence. After the first multi-way valve 31 is installed inside the first installation region 111 on the first surface 113 of the shell body 11, each first-valve-port is in one-to-one correspondence with and communicated with each first connection port each other, where the first-valve-port a 311 communicates with the first connection port a 1111 correspondingly, the first-valve-port b 312 communicates with the first connection port b 1112 correspondingly, the first-valve-port c 313 communicates with the first connection port c 1113 correspondingly, the first-valve-port e 314 communicates with the first connection port e 1114 correspondingly, and the first-valve-port f 315 communicates with the first connection port f 1115 correspondingly, the first-valve-port h 316 communicates with the first connection port h 1116 correspondingly, the first-valve-port k 317 communicates with the first connection port k 1117 correspondingly, the first-valve-port m 318 communicates with the first connection port m 1118 correspondingly, and the first-valve-port n 319 communicates with the first connection port h 1119 correspondingly. After the second multi-way valve 32 is installed in the second installation region 112 on the first surface 113 of the shell body 11, each second-valve-port is in one-to-one correspondence with and communicated with each second connection port each other, where the second-valve-port a 321 communicates with the second connection port a 1121 correspondingly, the second-valve-port b 322 communicates with the second connection port b 1122 correspondingly, the second-valve-port c 323 communicates with the second connection port c 1123 correspondingly, the second-valve-port e 324 communicates with the second connection port e 1124 correspondingly, and the second-valve-port f 325 communicates with the second connection port f 1125 correspondingly.

FIG. 10 is a schematic circulation diagram of the thermal management system provided by the present application.

As shown in FIG. 2, FIG. 4 and FIG. 10, the plurality of pipelines 130 includes a plurality of first pipelines (not shown in the figure), each first pipeline including two first sub-pipelines (not shown in the figure). A first end of one first sub-pipeline in each first pipeline corresponds to the first installation region 111, and a second end of the one first sub-pipeline in each first pipeline is configured for communicating with the water outlet pipe of the same component in the vehicle. A first end of the other first sub-pipeline in each first pipeline corresponds to the first installation region 111, a second end of the other first sub-pipeline in each first pipeline is configured for communicating with the water inlet pipe of the same component in the vehicle. The component includes at least one of a radiator 82, a battery cooling mechanism (referring to: a battery pack heat dissipating device, hereinafter abbreviated as: a battery cooling mechanism) 83, or a motor cooling mechanism (referring to: a motor heat dissipating device, hereinafter abbreviated as: motor cooling mechanism) 80.

In a possible implementation, in order to make the cooling liquid loops of various components of the vehicle independent from each other, and avoid interference phenomenon, the pipeline 130 disposed in the accommodation chamber includes a plurality of first pipelines, each first pipeline includes two first sub-pipelines, and the two first sub-pipelines are connected by the first multi-way valve 31 to form a first pipeline for the flow of cooling liquid.

Specifically, a first end of one first sub-pipeline in each first pipeline corresponds to and communicates with the first connection port in the first installation region 111, and a second end of the one first sub-pipeline in each first pipeline is configured for communicating with the water outlet pipe of the same component in the vehicle, and the cooling liquid flowing out of the component flows into the first multi-way valve 31 after passing through the first sub-pipeline. A first end of the other first sub-pipeline in each first pipeline corresponds to and communicates with the first connection port in the first installation region 111, and a second end of the other first sub-pipeline in each first pipeline is configured for communicating with the water inlet pipe of the same component in the vehicle, and the cooling liquid flowing out of the first multi-way valve 31 flows into the component after passing through the first sub-pipeline. The first ends of the two first sub-pipelines are connected through the first multi-way valve 31 to form the first pipeline, and then the first pipeline is communicated with the water inlet pipe and the water outlet pipe of the same component in the vehicle to form a closed cooling loop. The opening and closing state of the cooling loop is controlled by the first multi-way valve 31, so as to provide the cooling liquid for the components in the vehicle.

The components in the vehicle where the circulation of the cooling liquid is usually present mainly include the radiator 82, the battery cooling mechanism 83, the motor cooling mechanism 80 and other components. Among them, the battery cooling mechanism 83 is a cooling mechanism disposed on the battery pack of the vehicle, which is mainly attached to the battery pack for exchanging heat with the battery pack. After the cooling liquid flow through the cooling mechanism, it can absorb and take away the heat generated from the battery pack, so that the battery pack is in a range of better temperature during operation.

The motor cooling mechanism 80 is a cooling mechanism disposed on the motor of the vehicle, which is attached to the outer shell body of the motor for heat exchange. When the vehicle's motor starts to work, it will generate a large amount of heat. If the heat cannot be released in time, it will affect the working performance of the vehicle's motor. Therefore, after the cooling liquid flows through the cooling device on the vehicle motor, it can absorb and take away the heat generated from the motor, so that the vehicle's motor is in a range of better temperature during operation.

The radiator 82 is a device that is disposed in the vehicle for exchanging heat with the air. After the cooling liquid brings the absorbed heat to the radiator 82, the radiator 82 exchanges heat with the air so that it can transfer the heat to the air, thereby ensuring the normal operation of the vehicle.

As shown in FIG. 3, FIG. 4 and FIG. 9, second ends of the plurality of first sub-pipelines protrude from the accommo-dation chamber out of the shell body 11 to form a plurality of connection ports communicating with related components in the vehicle. Specifically, a water inlet pipe of radiator 131, a water outlet pipe of radiator 132, a water inlet pipe of motor cooling mechanism 133, and a water inlet pipe of battery cooling mechanism 135 are provided on the first surface 113 of the shell body 11; and a water outlet pipe of motor cooling mechanism 134 and a water outlet pipe of battery cooling mechanism 136 are provided on a first side 114 of the shell body 11.

The liquid inlet and the liquid outlet of the radiator 82 of the vehicle are communicated with the water inlet pipe of radiator 131 and the water outlet pipe of radiator 132, respectively; and the liquid inlet and the liquid outlet of the battery cooling mechanism 83 are communicated with the water inlet pipe of battery cooling mechanism 135 and the water outlet pipe of battery cooling mechanism 136, respectively. The liquid inlet and the liquid outlet of the motor cooling mechanism 80 are communicated with the water inlet pipe of motor cooling mechanism 133 and the water outlet pipe of motor cooling mechanism 134, respectively.

Please continue to refer to FIG. 10, in some embodiments, a plurality of pipelines 130 include a second pipeline (not shown in the figure) and a third pipeline (not shown in the figure). A first end of the second pipeline corresponds to the first installation region 111, and a first end of the third pipeline corresponds to the second installation region 112. The second pipeline includes two second sub-pipelines (not shown in the figure), and one second sub-pipeline of the second pipeline is configured for communicating with the water outlet pipe of the warm-air core body 85 in the vehicle, and the other second sub-pipeline of the second pipeline communicates with the water inlet pipe of the heater 84 in the vehicle.

The third pipeline includes two third sub-pipelines (not shown in the figure), and one third sub-pipeline of the third pipeline is configured for communicating with the water outlet pipe of heater 84, and the other third sub-pipeline of the third pipeline communicates with the water inlet pipe of the warm-air core body 85.

Specifically, the second pipeline includes two second sub-pipelines. A first end of one second sub-pipeline of the second pipeline is disposed in correspondence to the first installation region 111, and a second end of the one second sub-pipeline of the second pipeline is configured for com-municating with the water outlet pipe of the warm-air core body 85 in the vehicle. A first end of the other second sub-pipeline of the second pipeline is disposed in correspon-dence to the first installation region 111, and a second end of the other second sub-pipeline of the second pipeline is configured for communicating with the water inlet pipe of the heater 84 in the vehicle.

The third pipeline includes two third sub-pipelines. A first end of one third sub-pipeline of the third pipeline is disposed in correspondence to the second installation region 112, and a second end of the one third sub-pipeline of the third pipeline is configured for communicating with the water outlet pipe of the heater 84. A first end of the other third sub-pipeline of the third pipeline is disposed in correspon-dence to the second installation region 112, and a second end of the other third sub-pipeline of the third pipeline is configured for communicating with the water inlet pipe of the warm-air core body 85.

Both the heater 84 and the warm-air core body 85 are disposed on the vehicle body of the vehicle to provide warm air for a cockpit. The cockpit refers to a space that is disposed on the body of the vehicle in which the driver and passengers of vehicle ride. The heater 84 and the warm-air core body 85 are connected in series, and the cooling liquid flows through the heater 84 and the warm-air core body 85 sequentially after flowing out of the accommodation chamber. When the vehicle is running in a lower temperature environment, the cooling liquid flowing through the heater 84 can be heated up by starting the heater 84 to work, and then the cooling liquid after absorbing heat flows into the warm-air core body 85 through the pipeline 130. The warm-air core body 85 transfers heat to the cockpit through heat exchange, thereby increasing the temperature inside the cockpit. It should be noted that, in order to enhance the heat exchange efficiency between the warm-air core body 85 and the air, a fan (not shown in the figure) may be disposed at the position where the warm-air core body 85 is located, and blowing the air to the warm-air core body 85 by the fan enhances the heat exchange efficiency of the warm-air core body 85.

Please continue to refer to FIG. 4, FIG. 9 and FIG. 10, after second ends of the plurality of second sub-pipelines and third sub-pipelines protrude out of the shell body 11 from the accommodation chamber, they form a plurality of connection ports communicating with related components in the vehicle. Specifically, a water inlet pipe of heater 137, a water outlet pipe of heater 138, a water inlet pipe of warm-air core body 139 and a water outlet pipe of warm-air core body 140 are provided on the first side 114 of the shell body 11. Where, the liquid inlet and the liquid outlet of the heater 84 communicate with the water inlet pipe of heater 137 and the water outlet pipe of heater 138 respectively; and the liquid inlet and the liquid outlet of the warm-air core body 85 communicate with the water inlet pipe of warm-air core body 139 and the water outlet pipe of warm-air core body 140 respectively.

Please continue to refer to FIG. 3 and FIG. 4, the accommodation chamber is internally provided with a water storage region 150. The water storage region 150 is located above the pipeline 130 and has a liquid replenishment port (not shown in the figure), where the liquid replenishment port communicates with the pipeline 130 to replenish water to the pipeline 130.

In the present embodiment, in order to add the cooling liquid to the thermal management system and transport the cooling liquid into each component, the water storage region 150 is also provided in the accommodation chamber. The water storage region 150 is disposed above the pipeline 130. The shell body 11 is also provided with an injection port 151 located above the water storage region 150, the injection port 151 communicates with the water storage region 150, and the cooling liquid is added into the water storage region 150 through the injection port 151. The liquid replenishment port is provided below the water storage region 150 and communicates with the pipeline 130, the cooling liquid in the water storage region 150 is fed into each pipeline 130 through the liquid replenishment port for use by each component. It should be noted that, the opening and closing states of the injection port 151 and of the liquid replenishment port may be self-controlled by the thermal management system according to the loss degree of the cooling liquid.

Please continue to refer to FIG. 1 and FIG. 2, a water-cooled condenser 40 and a heat exchanger 50 are further included. The water-cooled condenser 40 is installed on the side of shell body 11 facing away from the cover plate 12, and has a first inlet (not shown in the figure) and a first outlet (not shown in the figure); the heat exchanger 50 is installed on the side of the cover plate 12 facing away from the shell body 11, and has a second inlet (not shown in the figure) and a second outlet (not shown in the figure).

A plurality of pipelines 130 include two fourth pipelines (not shown in the figure). A first end of one fourth pipeline corresponds to the second installation region 112, and the one fourth pipeline communicates with the first inlet; and a first end of the other fourth pipeline corresponds to the first installation region 111, and the other fourth pipeline communicates with the first outlet.

A plurality of pipelines 130 include two fifth pipelines (not shown in the figure). First ends of the fifth pipelines each correspond to the first installation region 111, one fifth pipeline communicates with the second outlet, and the other fifth pipeline communicates with the second inlet.

In the present embodiment, in order to facilitate the thermal management system to dissipate heat from the air-conditioning system in the vehicle, the thermal management system further includes a water-cooled condenser 40 installed on the first surface 113 of the shell body 11. The water-cooled condenser 40 is a device for heat exchange between the refrigerant in the air-conditioning system and the cooling liquid in the thermal management system. The cooling liquid and the refrigerant are injected into the water-cooled condenser 40 at the same time, the refrigerant may transfer the heat in the air-conditioning system to the water-cooled condenser 40, and then the heat is absorbed by the cooling liquid and transferred to the thermal management system, so that the temperature of the refrigerant can drop rapidly, thereby achieving the purpose of cooling the air-conditioning system. Correspondingly, the water-cooled condenser 40 is provided with a refrigerant inlet (not shown in the figure) and a refrigerant outlet (not shown in the figure) for the circulation of the refrigerant, as well as a first inlet (not shown in the figure) and a first outlet (not shown in the figure) for the circulation of the cooling liquid. The refrigerant inlet and the refrigerant outlet of the water-cooled condenser 40 communicate with the pipelines in the air conditioning system, respectively.

In order to enhance the cooling efficiency of the thermal management system, the thermal management system further includes a heat exchanger 50 installed on the side of the cover plate 12 facing away from the shell body 11. The heat exchanger 50 is a device for heat exchange between the refrigerant in the air conditioning system and the cooling liquid in the thermal management system. The cooling liquid and the refrigerant are injected into the heat exchanger 50 at the same time, the cooling liquid transfers the heat in the thermal management system to the heat exchanger 50, and then the heat is absorbed by the refrigerant and transferred to the air conditioning system, so that the temperature of the cooling liquid can drop rapidly, thereby achieving the purpose of cooling the thermal management system. Correspondingly, the heat exchanger 50 is provided with a refrigerant inlet (not shown in the figure) and a refrigerant outlet (not shown in the figure) for the circulation of the refrigerant, as well as a second inlet (not shown in the figure) and a second outlet (not shown in the figure) for the circulation of the cooling liquid. The refrigerant inlet and the refrigerant outlet of the heat exchanger 50 communicate with the pipelines in the air conditioning system, respectively.

In order to communicate the first inlet and the first outlet of the water-cooled condenser with the thermal management system, the plurality of pipelines 130 in the accommodation chamber include two fourth pipelines (not shown in the figure), where, a first end of one fourth pipeline corresponds to the second installation region 112 and communicates with the second connection port f 1125 in the second installation region 112, and the other end of the one fourth pipeline corresponds to and communicates with the first inlet of the water-cooled condenser 40. A first end of the other fourth pipeline corresponds to the first installation region 111 and communicates with the first connection port m 1118 in the first installation region 111. The cooling liquid flows out of the second connection port f 1125 and flows into the first inlet of the water-cooled condenser through the fourth pipeline, and then flows out of the first outlet of the water-cooled condenser 40 and flows into the first connection port m 1118 through the fourth pipeline, forming a cooling loop of the water-cooled condenser 40.

In order to communicate the second inlet and the second outlet of the heat exchanger 50 with the heat management system, the plurality of pipelines 130 in the accommodation chamber further include two fifth pipelines (not shown in the figure), where a first end of one fifth pipeline corresponds to the first installation region 111 and communicates with the first connection port h 1116 in the first installation region 111, and a second end of the one fifth pipeline corresponds to and communicates with the second inlet of the heat exchanger 50. A first end of the other fifth pipeline corresponds to the first installation region 111 and communicates with the first connection port b 1112 in the first installation region 111, and its second end corresponds to and communicates with the second outlet of the heat exchanger 50. The cooling liquid flows out of the first port h 1116 and flows into the second inlet of the heat exchanger 50 through the fifth pipeline, and then flows out of the first outlet of the heat exchanger 50 and flows into the first connection port b 1112 through the fifth pipeline, forming a cooling loop of the heat exchanger 50.

Please continue to refer to FIG. 1, FIG. 3, FIG. 4 and FIG. 10, a gas-liquid separator 60 is further included. The cover plate 12 has an installation part 120 located outside the accommodation chamber, and the gas-liquid separator 60 is installed on a side of the installation part 120 facing the shell body 11 and is adjacent to the water-cooled condenser 40. The refrigerant inlet of the gas-liquid separator 60 communicates with the refrigerant outlet of the heat exchanger 50, and the gas-liquid separator 60 is also configured for communicating with an outlet of an evaporator of air-conditioning unit of the vehicle.

In the present embodiment, in order to separate the gaseous refrigerant from the liquid refrigerant, the thermal management system further includes the gas-liquid separator 60. The gas-liquid separator 60 is installed on the cover plate 12. The cover plate 12 is provided with the installation part 120, which is located outside the accommodation chamber. The gas-liquid separator 60 is installed on the side of the installation part 120 facing the first surface 113 of the shell body 11, and is disposed adjacent to the water-cooled condenser 40. The gas-liquid separator 60 is provided with a refrigerant inlet and a refrigerant outlet, and the refrigerant inlet of the gas-liquid separator 60 communicates with the refrigerant outlet of the heat exchanger 50 and the refrigerant outlet of the evaporator of air-conditioning unit 90. The refrigerant outlet of the gas-liquid separator 60 communicates with the refrigerant outlet of the compressor 91. The refrigerants output from the heat exchanger 50 and the evaporator of air-conditioning unit 90 are subjected to gas-liquid separation after feeding into the gas-liquid separator 60, where the gaseous refrigerant is fed from the gas-liquid separator 60 into the compressor 91 for recycling.

Please continue to refer to FIG. 2 and FIG. 10, an integration valve of air conditioner 70 is further included. The integration valve of air conditioner 70 is installed on the side of the installation part 120 facing away from the shell body 11, and is adjacent to the heat exchanger 50. The integration valve of air conditioner 70 communicates with the refrigerant inlet of the water-cooled condenser 40 and the refrigerant inlet of the heat exchanger 50; the refrigerant outlet of the water-cooled condenser 40 communicates with the integration valve of air conditioner 70 through the coaxial pipe 93; the refrigerant outlet of the gas-liquid separator 60 communicates with a suction port of a compressor 91 of the vehicle through the coaxial pipe 93; the coaxial pipe 93 is also configured for communicating with an outlet of the condenser of air-conditioning unit 92 of the vehicle; the integration valve of air conditioner 70 is configured for communicating with an inlet of the condenser of air-conditioning unit 92, and the integration valve of air conditioner 70 is also configured for communicating with the exhaust port of the compressor 91.

In a possible implementation, in order to control the flow of refrigerant inside the air-conditioning system of the vehicle, the thermal management system further includes an integration valve of air conditioner 70. The integration valve of air conditioner 70 is installed on the side of the installation part 120 facing away from the shell body 11, and is disposed adjacent to the heat exchanger 50. Two switch valves and two expansion valves are disposed on the integration valve of air conditioner 70 at intervals, which are a first switch valve 71, a second switch valve 72, a first expansion valve 73 and a second expansion valve 74, respectively. The first switch valve 71 and the second switch valve 72 are disposed in parallel, and inlets of them communicate with the exhaust port of the compressor 91 through the pipelines. An outlet of the first switch valve 71 communicates with the refrigerant inlet of the condenser of air-conditioning unit 92 through a pipeline, and an outlet of the second switch valve 72 communicates with the refrigerant inlet of the water-cooled condenser 40 through a pipeline. It should be noted that, when the vehicle is in operation, only one of the two switch valves can be turned on, and the two switch valves cannot be turned on at the same time. That is, when the first switch valve 71 is turned on and the second switch valve 72 is closed off, the refrigerant output from the exhaust port of the compressor 91 passes through the first switch valve 71 and then feeds into the condenser of air conditioner 92; otherwise, the refrigerant will be fed into the water-cooled condenser 40 through the second switch valve 72.

The first expansion valve 73 and the second expansion valve 74 are disposed in parallel, and inlets of them each communicate with the coaxial pipe 93 through pipelines. An outlet of the first expansion valve 73 communicates with the refrigerant inlet of the heat exchanger 50 through a pipeline, and an outlet of the second expansion valve 74 communicates with the evaporator of air-conditioning unit 90 through a pipeline. It should be noted that, when the vehicle is in operation, the two expansion valves may be turned on at the same time, that is, the refrigerant output from the coaxial pipe 93 may enter the two expansion valves at the same time so as to be fed to different components.

The refrigerant outlet of the water-cooled condenser 40 communicates with the expansion valve through the coaxial pipe 93, the refrigerant outlet of the gas-liquid separator 60 communicates with the suction port of the compressor 91 through the coaxial pipe 93, and the refrigerant outlet of the condenser of air-conditioning unit 92 communicates with the expansion valve through the coaxial pipe 93.

Specifically, the circulate route of the refrigerant in the vehicle's air-conditioning system is as follows: after the refrigerant is fed from the exhaust port of the compressor 91 to the integration valve of air conditioner 70, there are two routes to choose. In first route, the refrigerant is fed into the condenser of air-conditioning unit 92 after passing through the first switch valve 71, and then fed into the coaxial pipe 93, and fed to the expansion valve from the coaxial pipe 93; in second route, the refrigerant is fed to the water-cooled condenser 40 after passing through the second switch valve 72, and then fed to the coaxial pipe 93, and fed to the expansion valve from the coaxial pipe 93. The refrigerant output from the expansion valve is divided into two paths. In first path, the refrigerant is fed from the first expansion valve 73 to the heat exchanger 50, and then fed to the gas-liquid separator 60, and fed to the compressor 91 through the coaxial pipe 93, forming a complete refrigerant circulation loop. In second path, the refrigerant is fed from the second expansion valve 74 into the evaporator of air-conditioning unit 90, and then fed into the gas-liquid separator 60, and fed into the compressor 91 through the coaxial pipe 93, forming a complete refrigerant circulation loop.

Please continue to refer to FIG. 1 and FIG. 10, the pump assembly 20 includes a heating water pump 21, a battery water pump 22 and a motor water pump 23; the heating water pump 21, the battery water pump 22 and the motor water pump 23 are each installed on a side of the shell body 11 facing away from the cover plate 12; and the heating water pump 21, the battery water pump 22 and the motor water pump 23 communicate with different pipelines located outside the accommodation chamber, respectively.

In the present embodiment, in order to speed up the flow rate of the cooling liquid inside the pipeline, the pump assembly 20 installed on the first surface 113 of the shell body 11 includes the heating water pump 21, the battery water pump 22 and the motor water pump 23. The heating water pump 21 and the heater 84 are connected in series, and a water outlet of the heating water pump 21 communicates with a water inlet of the heater 84 through the pipeline 130, and the heating water pump 21 can speed up the rate of the cooling liquid feeding into the heater 84. After the battery water pump 22 and the battery cooling mechanism 83 are connected in series, a water outlet of the battery water pump 22 communicates with a water inlet of the battery cooling mechanism 83 through the pipeline 130, and the battery water pump 22 can speed up the rate of the cooling liquid feeding into the battery cooling mechanism 83. After the motor water pump 23 and the motor cooling mechanism 80 are connected in series, a water outlet of the motor water pump 23 communicates with a water inlet of the motor cooling mechanism 80, and the motor water pump 23 can speed up the rate of the cooling liquid feeding into the motor cooling mechanism 80.

The present application also provides a vehicle, including a vehicle body and a thermal management system and an air-conditioning system installed on the vehicle body. The thermal management system and the air conditioning system have been explained in detail in the above contents, and will not be repeated here.

FIG. 11 is an enlarged schematic diagram at D in FIG. 10, and FIG. 12 is an enlarged schematic diagram at E in FIG. 10. In each circulation diagram, the combination of solid line and arrow represents the flow direction of the cooling liquid, the combination of dotted line and arrow represents the flow direction of the refrigerant, and the combination of double-dot dash line and arrow represents the flow direction during replenishment of the cooling liquid.

As shown in FIG. 1, FIG. 3, and FIG. 10 to FIG. 12, the heat conduction route of the thermal management system provided by the present application includes a cooling liquid loop communicated by a solid line and a refrigerant loop communicated by a dotted line in the figure. In short, in the cooling liquid loop, the heat is mainly transferred by the cooling liquid, and in the refrigerant loop, the heat is mainly transferred by the refrigerant. It should be noted that, the cooling liquid loop uses the pipeline 130 to communicate with various components, and the refrigerant loop uses the air conditioner pipeline (not shown in the figure) to communicate with various components.

The cooling liquid loop mainly includes a motor cooling mechanism loop, a battery cooling mechanism loop and a warm air loop. Among them, a liquid outlet of the motor cooling mechanism (referring to: a motor heat dissipating device, hereinafter abbreviated as: motor cooling mechanism) 80 communicates with the first-valve-port m 318, a liquid inlet of the motor water pump 23 communicates with the first-valve-port c 313, and a liquid outlet of the motor water pump 23 communicates with the second-valve-port e 324 and a liquid inlet of the motor cooling mechanism 80, respectively.

A liquid outlet of the battery cooling mechanism (referring to: battery pack heat dissipating device, hereinafter abbreviated as: battery cooling mechanism) 83 communicates with a liquid inlet of the controller 81 and the first-valve-port f 315 respectively; and a liquid inlet of the battery water pump 22 communicates with the first-valve-port a 311, and a liquid outlet of the battery water pump 22 communicates with a liquid inlet of the battery cooling mechanism 83. A liquid outlet of the controller 81 and the first-valve-port h 316 communicate with a liquid inlet of the heating water pump 21 and a liquid inlet of the heat exchanger 50 respectively. A liquid outlet of the heat exchanger 50 communicates with the first-valve-port b 312. A liquid outlet of the heating water pump 21 communicates with a liquid inlet of the heater 84, and a liquid outlet of the heater 84 communicates with the second-valve-port a 312. A liquid inlet of the warm-air core body 85 communicates with the second-valve-port c 323, and a liquid outlet port of the warm-air core body 85 communicates with a liquid inlet of the heating water pump 21. The second-valve-port b 322 communicates with the first-valve-port b 312, the second-valve-port f 325 communicates with a liquid inlet of the water-cooled condenser 40, a liquid outlet of the water-cooled condenser 40 communicates with the first-valve-port m 318, a liquid inlet of the radiator 82 communicates with the first-valve-port k 317, a liquid outlet of the radiator 82 communicates with the first-valve-port e 314, and the first-valve-port n 319 communicates with the first-valve-port e 314.

In the refrigerant loop, a refrigerant inlet of the condenser of air-conditioning unit 92 communicates with the first switch valve 71, a refrigerant outlet of the condenser of air-conditioning unit 92 communicates with the first expansion valve 73 and the second expansion valve 74 through the coaxial pipe 93. The first expansion valve 73 communicates with a refrigerant inlet of the heat exchanger 50, a refrigerant outlet of the heat exchanger 50 communicates with a refrigerant inlet of the gas-liquid separator 60, a refrigerant outlet of the gas-liquid separator 60 communicates with a refrigerant inlet of the compressor 91 through the coaxial pipe 93. The second expansion valve 74 communicates with a refrigerant inlet of the evaporator of air-conditioning unit 90, the refrigerant outlet of the evaporator of air-conditioning unit 90 communicates with a refrigerant inlet of the gas-liquid separator 60, and a refrigerant outlet of the compressor 91 communicates with the first switch valve 71 and the second switch valve 72 respectively. The second switching valve 72 communicates with a refrigerant inlet of the water-cooled condenser 40, and a refrigerant outlet of the water-cooled condenser 40 communicates with the first expansion valve 73 and the second expansion valve 74 through the coaxial pipe 93.

The water storage region 150 is configured for holding the cooling liquid, and the cooling liquid in the water storage region 150 flows into various pipelines 130 through the replenishment port to replenish the cooling liquid in real time, thereby preventing the decrease in the heat conduction efficiency of the system due to too rapid loss of the cooling liquid.

FIG. 13 is a schematic circulation diagram of a first working condition of the thermal management system provided by the present application.

As shown in FIG. 13, the first working condition provided by the present application is the cooling mode. In this working condition, the motor and the battery of the vehicle need to be cooled when the vehicle is running. The specific control method of the thermal management system includes as follows:

controlling the communication between the first first-valve-port m 318 and the second first-valve-port k 317 of the first multi-way valve 31, where the first first-valve-port m 318 communicates with the liquid outlet of the motor cooling mechanism 80, the second first-valve-port k 317 communicates with the liquid inlet of the radiator 82, the cooling liquid in the motor cooling mechanism 80 flows into the radiator 82 through the first first-valve-port m 318 and the second first-valve-port k 317 in turn;

controlling the communication between a third first-valve-port e 314 and a fourth first-valve-port c 313 of the first multi-way valve 31, where the liquid outlet of the radiator 82 communicates with the third first-valve-port e 314, and the fourth first-valve-port c 313 communicates with the liquid inlet of the motor cooling mechanism 80, and the cooling liquid flowing into the radiator 82 is cooled in the radiator 82, and then flows in the motor cooling mechanism 80 through the third first-valve-port e 314 and the fourth first-valve-port c 313 in turn.

By controlling the first multi-way valve 31, the flow direction of the cooling liquid in the motor cooling mechanism loop is as follows. The cooling liquid flows out of the motor cooling mechanism 80, flows into the first-valve-port m 318, and then flows into the first-valve-port k 317, and flows into the liquid inlet of the radiator 82 through the first-valve-port k 317. After heat exchange by the radiator 82, the cooling liquid flows into the first-valve-port e 314 from the liquid outlet of the radiator 82, flows from the first-valve-port e 314 into the first-valve-port c 313, and then flows out of the first-valve-port c 313 and flows into the motor water pump 23, and flows into the motor cooling mechanism 80 after cyclic supercharging of the motor water pump 23, thereby forming a closed loop. The cooling liquid absorbs the heat generated by the motor cooling mechanism 80 and transfers it to the radiator 82, and after heat exchange with the air through the radiator 82, the heat absorbed by the cooling liquid is transferred to the air, thereby realizing the cooling of the motor cooling mechanism 80.

The fifth first-valve-port f 315 is controlled to be communicated with the sixth first-valve-port h 316 in the first multi-way valve 31, where the fifth first-valve-port f 315 communicates with the liquid outlet of the battery cooling mechanism 83, and the sixth first-valve-port h 316 communicates with the liquid inlet of the heat exchanger 50, and the cooling liquid in the battery cooling mechanism 83 flows into the heat exchanger 50 through the fifth first-valve-port f 315 and the sixth first-valve-port h 316 in turn;

the seventh first-valve-port b 312 is controlled to be communicated with the eighth first-valve-port a 311 in the first multi-way valve 31, where the liquid outlet of the heat exchanger 50 communicates with the seventh first-valve-port b 312, and the liquid inlet of the battery cooling mechanism 83 communicates with the eighth first-valve-port a 311; the cooling liquid flowing into the heat exchanger 50 is cooled in the heat exchanger 50, and then flows into the battery cooling mechanism 83 through the seventh first-valve-port b 312 and the eighth first-valve-port in sequence a 311.

By controlling the first multi-way valve 31, the flow direction of the cooling liquid in the battery cooling mechanism loop is as follows. The cooling liquid flows out of the battery cooling mechanism 83 and is divided into two paths of cooling liquid. In one path, the cooling liquid flows into the first-valve-port f 315, and then flows into the first-valve-port h 316 and flows out of the first-valve-port h 316; and in the other path, the cooling liquid flows through the controller 81 and then converges with the cooling liquid flowing out of the first-valve-port h 316 to flow into the heat exchanger 50 together, then flows into the first-valve-port b 312 from the heat exchanger 50. Next, the cooling liquid flows into the first-valve-port a 311 and flows out of the first-valve-port a 311 into the battery water pump 22, and flows into the battery cooling mechanism 83 after cyclic supercharging of the motor water pump 23, forming a closed loop. The cooling liquid absorbs the heat generated by the battery cooling mechanism 83 and the controller 81 and transfers it to the heat exchanger 50. In the heat exchanger 50, heat exchange is performed with the refrigerant, so as to transfer the absorbed heat to the refrigerant, thereby realizing the cooling of battery cooling mechanism 83 and the controller 81.

A first second-valve-port a 321 is controlled to be in communication with a second second-valve-port c 323 in the second multi-way valve 32, where the first second-valve-port a 321 communicates with the liquid outlet of the heater 84, the second second-valve-port c 323 communicates with the liquid inlet of the warm-air core body 85, and the liquid outlet of the warm-air core body 85 communicates with the liquid inlet of the heater 84;

a cooling liquid flowing out of the heater 84 flows into the heater 84 through the first second-valve-ports a 321, the second second-valve-ports c 323, and the warm-air core body 85 in turn.

The warm air loop is used to heat the cockpit of the vehicle. After being heated by the heater 84, the cooling liquid flows into the second-valve-port a 321 from the liquid outlet of the heater 84, then flows into the second-valve-port c 323 from the second-valve-port a 321, and flows into the warm-air core body 85, and the cooling liquid flows into the heating water pump 21 after flowing out of the warm-air core body 85, and flows into the liquid inlet of the heater 84 after cyclic supercharging of the heating water pump 21, thereby forming a closed loop. The heater 84 is mainly used to heat the cooling liquid, and the warm-air core body 85 is disposed in the cockpit for heat exchange. By the warm-air core body 85, the heat absorbed by the cooling liquid is transferred to the cockpit, thereby realizing heating of the cockpit. It should be noted that, the loop is only suitable for the driver to preheat the cockpit in a low temperature environment. When the ambient temperature is higher, the loop is in a state of stopping operation.

FIG. 14 is a schematic circulation diagram of a second working condition of the thermal management system provided by the present application.

As shown in FIG. 14, the second working condition provided by the present application is the heat dissipation mode of shared radiator. In this working condition, the motor cooling mechanism loop and the battery cooling mechanism loop are communicated to each other and share the same radiator for heat dissipation. The specific control method of the thermal management system includes the following steps:

controlling the communication between the third first-valve-port e 314 and the eighth first-valve-port a 311 in the first multi-way valve 31, where the cooling liquid flowing into the radiator 82 is cooled in the radiator 82, and then flows into the battery cooling mechanism 83 through the third first-valve-port e 314 and the eighth first-valve-port a 311 in turn;

controlling the communication between the seventh first-valve-port b 312 and the fourth first-valve-port c 313 in the first multi-way valve 31, where the cooling liquid flowing into the heat exchanger 50 is cooled in the heat exchanger 50, and then flows into the motor cooling mechanism 80 through the seventh first-valve-port b 312 and the fourth first-valve-port c 313 in turn.

By controlling the first multi-way valve 31, the flow direction of the serial loop composed of the motor cooling mechanism 80 and the battery cooling mechanism 83 is as follows. The cooling liquid flows out of the liquid outlet of the motor cooling mechanism 80 and flows into the first-valve-port m 318, then flows into the first-valve-port k 317, and flows into the liquid inlet of the radiator 82 from the first-valve-port k 317, and then flows into the first-valve-port e 314 from the liquid outlet of the radiator 82 after the heat exchange by the radiator 82, then flows into the first-valve-port a 311, and flows into the battery water pump 22 from the first-valve-port a 311, and flows into the battery cooling mechanism 83 after cyclic supercharging of the battery water pump 22. The cooling liquid flowing out of the battery cooling mechanism 83 is divided into two paths of cooling liquid. In one path, the cooling liquid flows into the first-valve-port f 315, then flows into the first-valve-port h 316 and flows out of the first-valve-port h 316; and in the other path, the cooling liquid flows through the controller 81 and then converges with the cooling liquid flowing out of the first-valve-port h 316 to flow into the heat exchanger 50 together, then flows into the first-valve-port b 312 from the heat exchanger 50, further flows into the first-valve-port c 313, flows into the motor water pump 23 from the first-valve-port c 313, and flows into the liquid inlet of the motor cooling mechanism 80 after cyclic supercharging of the motor water pump 23, forming a closed loop. At this time, the motor cooling mechanism 80, the battery cooling mechanism 83 and the controller 81 are connected in series in the same loop, the heat generated by the three is absorbed by the cooling liquid and transferred to the radiator 82, and the treatment of heat dissipation and cooling is performed by the radiator 82 in a unified manner.

FIG. 15 is a schematic circulation diagram of a third working condition of the thermal management system provided by the present application.

As shown in FIG. 15, the third working condition provided by the present application is the rapid temperature rise mode of the motor cooling mechanism. In this working condition, when the vehicle is started, the motor cooling mechanism 80 is rapidly preheated, so that the temperature of the motor cooling mechanism 80 rises to the better working temperature range as soon as possible. Correspondingly, preheating treatment will also be performed on the battery cooling mechanism 83 and the controller 81, so that the temperature of the both rise to a better working temperature range as soon as possible. The specific control method of the thermal management system includes the following steps:

controlling the communication between the first first-valve-port m 318 and the ninth first-valve-port n 319 in the first multi-way valve 31, where the ninth first-valve-port n 319 communicates with the third first-valve-port e 314, the third first-valve-port e 314 communicates with the fourth first-valve-port c 313, and the cooling liquid in the motor cooling mechanism 80 flows into the motor cooling mechanism 80 through the first first-valve-port m 318, the ninth first-valve-port n 319, the third first-valve-port e 314 and the fourth first-valve-port c 313;

controlling the communication between the seventh first-valve-port b 312 and the eighth first-valve-port a 311 in the first multi-way valve 31, where the cooling liquid flowing out of the heat exchanger 50 flows into the battery cooling mechanism 83 through the seventh first-valve-port b 312 and the eighth first-valve-port a 311 in turn.

By controlling the first multi-way valve 31, the flow direction of the motor cooling mechanism loop is as follows. The cooling liquid flows into the first-valve-port m 318 from the motor cooling mechanism 80, and then flows through the first-valve-port n 319, the first-valve-port e 314, and the first-valve-port c 313 in turn, flows into the motor water pump 23 from the first-valve-port c 313, and flows into the motor cooling mechanism 80 after cyclic supercharging of the motor water pump 23, forming a closed loop. In this loop, since the cooling liquid does not pass through the radiator 82, the heat absorbed by the cooling liquid from the motor cooling mechanism 80 can also be transferred to the motor cooling mechanism 80 again, thereby reducing the heat loss of the motor cooling mechanism 80 and enabling the temperature of the motor cooling mechanism 80 to quickly rise to the better working temperature range.

By controlling the first multi-way valve 31, the flow direction of the battery cooling mechanism loop is as follows: the cooling liquid flows out of the battery cooling mechanism 83 and is divided into two paths of cooling liquid. In one path, the cooling liquid flows into the first-valve-port f 315, then flows into the first-valve-port h 316 and flows out of the second-valve-port h 316. In the other path, the cooling liquid flows through the controller 81 and converges with the cooling liquid flowing out of the first-valve-port h 316 to co-flow into the heat exchanger 50, flows into the first-valve-port b 312 from the heat exchanger 50, then flows into the first-valve-port a 311 and flows into the battery water pump 22 from the first-valve-port a 311, and flows into the battery cooling mechanism 83 after cyclic supercharging of the battery water pump 22, forming a closed loop. In this working condition, the heat exchanger 50 does not start to work, that is, the heat exchanger 50 does not perform a heat dissipation treatment on the influent cooling liquid, so the heat absorbed by the cooling liquid from the battery cooling mechanism 83 and the controller 81 can be transferred to the battery cooling mechanism 83 and the controller 81 again, thereby reducing the heat loss of the battery cooling mechanism 83 and the controller 81, and enabling the temperature of the battery cooling mechanism 83 and the controller 81 to quickly rise to the better working temperature range.

In addition, in this working condition, the temperature of the cockpit is also low. The warm air loop is started to heat the cockpit. When the temperature in the cockpit rises to a certain value, the operation of loop is closed.

FIG. 16 is a schematic circulation diagram of a fourth working condition of the thermal management system provided by the present application.

As shown in FIG. 16, the fourth working condition provided by the present application is waste heat recovery mode. In this working condition, the battery cooling mechanism 83 and the controller 81 are heated by collecting the heat generated by the motor cooling mechanism 80. When the motor cooling mechanism 80 is started for a period of time, its temperature can quickly rise to the better working temperature range, while the temperatures of the battery cooling mechanism 83 and the controller 81 are still in a lower state, so it is possible to transfer the heat generated by the motor cooling mechanism 80 to the battery cooling mechanism 83 and the controller 81 so that the temperature of both can rise to a better working temperature range as soon as possible. In this working condition, the motor cooling mechanism loop and the battery cooling mechanism loop are connected to form a serial loop. The specific control method of the thermal management system includes the following steps:

controlling the communication between the third first-valve-port e 314 and the eighth first-valve-port a 311 in the first multi-way valve 31, where the cooling liquid in the motor cooling mechanism 80 flows into the battery cooling mechanism 83 through the first first-valve-port m 318, the ninth first-valve-port n 319, the third first-valve-port e 314 and the eighth first-valve-port a 311 in turn;

controlling the communication between the seventh first-valve-port b 312 and the fourth first-valve-port c 313 in the first multi-way valve 31, where the cooling liquid flowing out of the heat exchanger 50 flows into the motor cooling mechanism 80 through the seventh first-valve-port b 312 and the fourth first-valve-port c 313 in turn.

By controlling the first multi-way valve 31, the flow direction of the serial loop of the motor cooling mechanism 80 and the battery cooling mechanism 83 is as follows: the cooling liquid flows into the first-valve-port m 318 from the motor cooling mechanism 80, flows through the first-valve-port n 319, the first-valve-port e 314 and the first-valve-port a 311 in turn, and flows into the battery water pump 22 through the first-valve-port a 311, and flows into the battery cooling mechanism 83 after cyclic supercharging of the battery water pump 22. The cooling liquid flowing out of the battery cooling mechanism 83 is divided into two paths of cooling liquid, in one path, the cooling liquid flows into the first-valve-port f 315, then flows into the first-valve-port h 316 and flows out of the first-valve-port h 316. In the other path, the cooling liquid flows through the controller 81 and then converges with the cooling liquid flowing out of the first-valve-port h 316 to flow into the heat exchanger 50 together, flows into the first-valve-port b 312 from the heat exchanger 50, flows into the first-valve-port c 313 and then flows into the motor water pump 23 from the first-valve-port c 313, and flows into the motor cooling mechanism 80 after cyclic supercharging of the motor water pump 23, forming a closed loop. In this working condition, both the radiator 82 and the heat exchanger 50 are in a stopped state, and the heat generated by the motor cooling mechanism 80 is transferred by the cooling liquid to the battery cooling mechanism 83 and the controller 81 to heat them.

At this time, the working state of the warm air loop depends on the level of the environmental temperature to decide whether to turn on or not.

FIG. 17 is a schematic circulation diagram of a fifth working condition of the thermal management system provided by the present application.

As shown in FIG. 17, the fifth working condition provided by the present application is that the temperature of motor cooling mechanism 80 rapidly rises, the battery cooling mechanism 83 has no flow request and the controller 81 has a flow request. In this working condition, the motor cooling mechanism loop is the same as that in the third working condition, which will not be repeated one by one, and only the battery cooling mechanism loop will be described below.

By controlling the first multi-way valve 31, the specific flow direction of the battery cooling mechanism loop is as follows: the cooling liquid flows out of the battery cooling mechanism 83 and flows into the controller 81, and then flows into the heat exchanger 50 after flowing out of the controller 81, and then flows into the first-valve-port b 312 from the heat exchanger 50, then flows into the first-valve-port a 311 and flows into the battery water pump 22 from the first-valve-port a 311, and then flows into the battery cooling mechanism 83 after cyclic supercharging of the battery water pump 22, forming a closed loop. In this working condition, the controller 81 requires a relatively large flow of cooling fluid during operation, so all the cooling fluid flowing out of the battery cooling mechanism 83 is fed into the controller 81 to meet its working requirements. However, the flow of the cooling liquid flowing through the battery cooling mechanism 83 will not change.

FIG. 18 is a schematic circulation diagram of a sixth working condition of the thermal management system provided by the present application.

As shown in FIG. 18, the sixth working condition provided by the present application is that the motor cooling mechanism 80 needs to be cooled, the battery cooling mechanism 83 has no flow request and the controller 81 has a flow request as well as the degassing mode. In this working condition, the circulation direction of the motor cooling mechanism loop is consistent with the circulation mode of the motor cooling mechanism loop under the first working condition. The battery cooling mechanism loop is consistent with that under the fifth working condition, so it will be repeated here! However, it should be noted that when the vehicle is being maintained, air usually enters the controller 81, so the degassing mode refers to exhaustion of the air entered the controller 81. By the mode of the cooling liquid completely flowing into the controller 81, the air inside the controller 81 is discharged from the replenishment port of the water storage region 150, thereby avoiding affecting the operation of the vehicle.

In addition, in the sixth working condition, the warm air loop is also in a stopped state.

FIG. 19 is a schematic circulation diagram of a seventh working condition of the thermal management system provided by the present application.

As shown in FIG. 19, the seventh working condition provided by this application is the large tandem auxiliary degassing mode. This working condition is to perform exhaust treatment on the entire thermal management system. In this case, the motor cooling mechanism loop is connected with the battery cooling mechanism loop to form a large tandem loop.

The flow direction of the cooling liquid in the large tandem loop is as follow: the cooling liquid flows into the first-valve-port m 318 from the motor cooling mechanism

80, next flows into the first-valve-port k 317, flows into the radiator 82 from the first-valve-port k 317, flows out of the radiator 82 and flows into the first-valve-port e 314, flows into the first-valve-port a 311, flows out of the first-valve-port a 311 and flows into the battery water pump 22, flows into the battery cooling mechanism 83 after cyclic supercharging of the battery water pump 22, flows out of the battery cooling mechanism 83 and all flows into the controller 81, then flows into the heat exchanger 50 after flowing out of the controller 81, then flows into the first-valve-port b 312 after flowing out of the heat exchanger 50, flows into the first-valve-port c 313 and flows into the motor water pump 23 from the first-valve-port c 313, and flows into the motor cooling mechanism 80 after cyclic supercharging of the water pump 23 of the motor cooling mechanism 80, forming a closed loop. In this working condition, the vehicle is at a stopped state, and both the radiator 82 and the heat exchanger 50 are in a stop-working state. At this time, the radiator 82 is equivalent to a large-capacity gas-liquid separation device, the air in the heat management system is exhausted into the radiator 82 by the cooling liquid, and the air is exhausted by the radiator 82, thereby making the whole system work in a normal cycle.

Correspondingly, since the vehicle is in a stopped state, the warm air loop is also in a stop-working state.

Finally, it should be noted that the foregoing embodiments are merely intended for describing the technical solutions of the present application other than limiting the present application. Although the present disclosure is described in detail with reference to the foregoing embodiments, persons of ordinary skill in the art should understand that they may still make modifications to the technical solutions described in the foregoing embodiments or make equivalent substitutions to some or all technical features thereof, and these modifications or substitutions do not make the essence of corresponding technical solutions depart from the scope of the technical solutions of embodiments of the present application.

What is claimed is:

1. A thermal management system, comprising: a tank assembly, a valve unit, a radiator and a heat exchanger, the tank assembly comprises a shell body and a cover plate, the shell body covers the cover plate and forms an accommodation chamber together with the cover plate, and the valve unit is installed on the shell body;

a plurality of pipelines for liquid circulation is disposed in the accommodation chamber, and the shell body has a plurality of connection ports communicating with the accommodation chamber, a first end of one pipeline of the plurality of pipelines communicates with one connection port of the plurality of connection ports in one-to-one correspondence, and a second end of the one pipeline of the plurality of pipelines and a portion of the one pipeline of the plurality of pipelines are located outside the accommodation chamber;

the valve unit has a plurality of valve ports, and the valve ports communicate with the connection ports in one-to-one correspondence, the valve unit comprise a first multi-way valve and a second multi-way valve, and the plurality of valve ports comprise a plurality of first-valve-ports and a plurality of second-valve-ports, the first-valve-ports are located at the first multi-way valve, and the second-valve-ports are located at the second multi-way valve;

the radiator and the heat exchanger communicate with different pipelines, respectively;

wherein a side of the shell body facing away from the cover plate has a first installation region and a second installation region, and the plurality of connection ports comprises a plurality of first connection ports and a plurality of second connection ports, the first connection ports are located in the first installation region, and the second connection ports are located in the second installation region;

the first multi-way valve is connected in the first installation region, and the first connection ports communicate with the first-valve-ports in one-to-one correspondence, the second multi-way valve is connected in the second installation region, and the second connection ports communicate with the second-valve-ports in a one-to-one correspondence.

2. A vehicle, comprising: a vehicle body and the thermal management system according to claim 1 installed on the vehicle body.

3. A thermal management method, adopting the thermal management system according to claim 1;

the method comprises following steps:

controlling communication between a first first-valve-port and a second first-valve-port in the first multi-way valve, wherein the first first-valve-port communicates with a liquid outlet of a motor cooler, the second first-valve-port communicates with a liquid inlet of the radiator, a cooling liquid in the motor cooler flows into the radiator through the first first-valve-port and the second first-valve-port in turn;

controlling communication between a third first-valve-port and a fourth first-valve-port in the first multi-way valve, wherein a liquid outlet of the radiator communicates with the third first-valve-port, the fourth first-valve-port communicates with a liquid inlet of the motor cooler, and the cooling liquid flowing into the radiator flows into the motor cooler through the third first-valve-port and the fourth first-valve-port in turn after being cooled in the radiator.

4. The thermal management method according to claim 3, wherein the method further comprises following steps:

controlling communication between a fifth first-valve-port and a sixth first-valve-port in the first multi-way valve, wherein the fifth first-valve-port communicates with a liquid outlet of a battery cooler, and the sixth first-valve-port communicates with a liquid inlet of the heat exchanger, and the cooling liquid in the battery cooler flows into the heat exchanger through the fifth first-valve-port and the sixth first-valve-port in turn;

controlling communication between a seventh first-valve-port and an eighth first-valve-port in the first multi-way valve, wherein a liquid outlet of the heat exchanger communicates with the seventh first-valve-port, and a liquid inlet of the battery cooler communicates with the eighth first-valve-port, the cooling liquid flowing into the heat exchanger flows into the battery cooler through the seventh first-valve-port and the eighth first-valve-port in turn after being cooled in the heat exchanger.

5. The thermal management method according to claim 4, wherein the method further comprises following steps:

controlling communication between the third first-valve-port and the eighth first-valve-port in the first multi-way valve, wherein the cooling liquid flowing into the radiator flows into the battery cooler through the third first-valve-port and the eighth first-valve-port in turn after being cooled in the radiator;

controlling communication between the seventh first-valve-port and the fourth first-valve-port in the first multi-way valve, wherein the cooling liquid flowing into the heat exchanger flows into the motor cooler through the seventh first-valve-port and the fourth first-valve-port in turn after being cooled in the heat exchanger.

6. The thermal management method according to claim 4, wherein the method further comprises following steps:
controlling communication between the first first-valve-port and a ninth first-valve-port in the first multi-way valve, wherein the ninth first-valve-port communicates with the third first-valve-port, and the third first-valve-port communicates with the fourth first-valve-port, and the cooling liquid in the motor cooler flows into the motor cooler through the first first-valve-port, the ninth first-valve-port, the third first-valve-port and the fourth first-valve-port in turn;
controlling communication between the seventh first-valve-port and the eighth first-valve-port in the first multi-way valve, wherein the cooling liquid flowing out of the heat exchanger flows into the battery cooler through the seventh first-valve-port and the eighth first-valve-port in turn.

7. The thermal management method according to claim 4, wherein the method further comprises following steps:
controlling communication between the third first-valve-port and the eighth first-valve-port in the first multi-way valve, wherein the cooling liquid in the motor cooler flows into the battery cooler through the first first-valve-port, the ninth first-valve-port, the third first-valve-port and the eighth first-valve-port in turn;
controlling communication between the seventh first-valve-port and the fourth first-valve-port in the first multi-way valve, wherein the cooling liquid flowing out of the heat exchanger flows into the motor cooler through the seventh first-valve-port and the fourth first-valve-port in turn.

8. The thermal management method according to claim 4, wherein the method further comprises following steps:
a part of the cooling liquid flowing out of the battery cooler flows into a controller, and the cooling liquid flowing out of the controller flows into the heat exchanger.

9. The thermal management method according to claim 8, wherein the method further comprises following steps:
controlling communication between the seventh first-valve-port and the eighth first-valve-port in the first multi-way valve, wherein the cooling liquid in the battery cooler flows into the heat exchanger through the controller, and the cooling liquid flowing out of the heat exchanger flows into the battery cooler through the seventh first-valve-port and the eighth first-valve-port.

10. The thermal management method according to claim 4, wherein the method further comprises following steps:
controlling communication between a first second-valve-port and a second second-valve-port in the second multi-way valve, wherein the first second-valve-port communicates with a liquid outlet of a heater, the second second-valve-port communicates with a liquid inlet of a warm-air core body, and a liquid outlet of the warm-air core body communicates with a liquid inlet of the heater;
the cooling liquid flowing out of the heater flows into the heater through the first second-valve-port, the second second-valve-port and the warm-air core body in turn.

11. A thermal management system, comprising: a tank assembly, a pump assembly, and a valve unit, the tank assembly comprises a shell body and a cover plate, the shell body covers the cover plate and forms an accommodation chamber together with the cover plate, and the pump assembly and the valve unit are each installed on the shell body;
a plurality of pipelines for liquid circulation is disposed in the accommodation chamber, and the shell body has a plurality of connection ports communicating with the accommodation chamber, a first end of one pipeline of the plurality of pipelines communicates with one connection port of the plurality of connection ports in one-to-one correspondence, and a second end of the one pipeline of the plurality of pipelines and a portion of the pipeline are located outside the accommodation chamber;
the valve unit has a plurality of valve ports, and the valve ports communicate with the connection ports in one-to-one correspondence, and the valve unit is configured for controlling a disconnection or connection between each connection port and its corresponding valve port, so as to control a disconnection or connection between the pipelines;
wherein a side of the shell body facing away from the cover plate has a first installation region and a second installation region, and the plurality of connection ports comprises a plurality of first connection ports and a plurality of second connection ports, the first connection ports are located in the first installation region, and the second connection ports are located in the second installation region;
the valve unit comprises a first multi-way valve and a second multi-way valve, and a plurality of valve ports comprises a plurality of first-valve-ports and a plurality of second-valve-ports, the first-valve-ports are located at the first multi-way valve, and the second-valve-ports are located at the second multi-way valve;
the first multi-way valve is connected in the first installation region, and the first connection ports communicate with the first-valve-ports in one-to-one correspondence, the second multi-way valve is connected in the second installation region, and the second connection ports communicate with the second-valve-ports in a one-to-one correspondence.

12. The thermal management system according to claim 11, wherein the plurality of pipelines comprises a plurality of first pipelines, each first pipeline comprises two first sub-pipelines, and a first end of one first sub-pipeline in the each first pipeline corresponds to the first installation region, a second end of the one first sub-pipeline in the each first pipeline is configured for communicating with a water outlet pipe of same component in a vehicle, a first end of the other first sub-pipeline in the each first pipeline corresponds to the first installation region, and a second end of the other first sub-pipeline in the each first pipeline is configured for communicating with a water inlet pipe of same component in the vehicle;
the component comprises at least one of a radiator, a battery cooler, and an motor cooler.

13. The thermal management system according to claim 12, further comprising a water-cooled condenser and a heat exchanger, the water-cooled condenser is installed on a side of the shell body facing away from the cover plate and has a first inlet and a first outlet, the heat exchanger is installed on a side of the cover plate facing away from the shell body and has a second inlet and a second outlet;
the plurality of pipelines comprise two fourth pipelines, a first end of one fourth pipeline corresponds to the second installation region and the one fourth pipeline communicates with the first inlet, and a first end of the other fourth pipeline corresponds to the first installation region and the other fourth pipeline communicates with the first outlet;

the plurality of pipelines comprise two fifth pipelines, a first end of each fifth pipeline corresponds to the first installation region, one fifth pipeline communicates with the second outlet, and the other fifth pipeline communicates with the second inlet.

14. The thermal management system according to claim 13, further comprising a gas-liquid separator, the cover plate has an installation board located outside the accommodation chamber, and the gas-liquid separator is installed on a side of the installation board facing the shell body, and the gas-liquid separator is adjacent to the water-cooled condenser;

a refrigerant inlet of the gas-liquid separator communicates with a refrigerant outlet of the heat exchanger, and the gas-liquid separator is also configured for communicating with an outlet of an air-conditioning unit evaporator of the vehicle.

15. The thermal management system according to claim 14, further comprising an integration valve of air conditioner, the integration valve of air conditioner is installed on a side of the installation board facing away from the shell body, is adjacent to the heat exchanger, and communicates with a refrigerant inlet of the water-cooled condenser and a refrigerant inlet of the heat exchanger, respectively;

a refrigerant outlet of the water-cooled condenser communicates with the integration valve of air conditioner through a coaxial pipe;

a refrigerant outlet of the gas-liquid separator communicates with a suction port of a compressor of the vehicle through the coaxial pipe;

the coaxial pipe is also configured for communicating with an outlet of a condenser inside an air-conditioning unit of the vehicle;

the integration valve of air conditioner is configured for communicating with an inlet of the condenser inside the air-conditioning unit, and is also configured for communicating with an exhaust port of the compressor.

16. The thermal management system according to claim 11, wherein the plurality of pipelines comprises a second pipeline and a third pipeline, a first end of the second pipeline corresponds to the first installation region, and a first end of the third pipeline corresponds to the second installation region;

the second pipeline comprises two second sub-pipelines, one second sub-pipeline in the second pipeline is configured for communicating with a water outlet pipe of a warm-air core body in a vehicle, and the other second sub-pipeline in the second pipeline communicates with a water inlet pipe of a heater in the vehicle;

the third pipeline comprises two third sub-pipelines, one third sub-pipeline in the third pipeline is configured for communicating with a water outlet pipe of the heater, and the other third sub-pipeline in the third pipeline communicates with a water inlet pipe of the warm-air core body.

17. The thermal management system according to claim 11, wherein a water storage region is disposed in the accommodation chamber, and the water storage region is located above the plurality of pipelines;

the water storage region has a liquid replenishment port communicating with the pipeline.

18. The thermal management system according to claim 11, wherein the pump assembly comprises a heating water pump, a battery water pump, and a motor water pump that are each installed on a side of the shell body facing away from the cover plate, and the heating water pump, the battery water pump and the motor water pump are connected with different pipelines located outside the accommodation chamber respectively.

* * * * *